(12) United States Patent
Wiseman et al.

(10) Patent No.: US 8,650,401 B2
(45) Date of Patent: *Feb. 11, 2014

(54) NETWORK HAVING QUANTUM KEY DISTRIBUTION

(75) Inventors: Simon Robert Wiseman, Malvern (GB); Brian Sinclair Lowans, Malvern (GB)

(73) Assignee: Qinetiq Limited, London (GB)

( * ) Notice: Subject to any disclaimer, the term of this patent is extended or adjusted under 35 U.S.C. 154(b) by 202 days.

This patent is subject to a terminal disclaimer.

(21) Appl. No.: 12/863,483

(22) PCT Filed: Jan. 23, 2009

(86) PCT No.: PCT/GB2009/000186
§ 371 (c)(1), (2), (4) Date: Jul. 19, 2010

(87) PCT Pub. No.: WO2009/093034
PCT Pub. Date: Jul. 30, 2009

(65) Prior Publication Data
US 2010/0299526 A1 Nov. 25, 2010

Related U.S. Application Data

(60) Provisional application No. 61/023,573, filed on Jan. 25, 2008.

(30) Foreign Application Priority Data

Jan. 25, 2008 (GB) .................................. 0801395.5

(51) Int. Cl.
*H04L 9/32* (2006.01)
*H04L 9/00* (2006.01)
*H04K 1/00* (2006.01)
*H04M 1/70* (2006.01)

(52) U.S. Cl.
USPC ............... 713/171; 380/28; 380/41; 380/256; 380/277

(58) Field of Classification Search
USPC ...................... 713/171; 380/28, 41, 256, 277
See application file for complete search history.

(56) References Cited

U.S. PATENT DOCUMENTS

| 3,704,996 A | 12/1972 | Borner et al. |
| 4,291,939 A | 9/1981 | Giallorenzi et al. |

(Continued)

FOREIGN PATENT DOCUMENTS

| EP | 0 583 115 A1 | 2/1994 |
| EP | 0 610 727 A1 | 8/1994 |

(Continued)

OTHER PUBLICATIONS

Office Action dated May 11, 2012 issued in U.S. Appl. No. 12/812,849.

(Continued)

*Primary Examiner* — Mohammad W Reza
(74) *Attorney, Agent, or Firm* — Oliff & Berridge, PLC

(57) ABSTRACT

A method of performing quantum key distribution across a network. The method involves a first node first agreeing a quantum key with a first intermediate node in the path. Next the intermediate node exchanges a quantum signal with the next node in the path—which is a targeted node. The intermediate node communicates with the first node using the previous established quantum key details of the quantum signal sent or received by the intermediate node. The first node then performs a key agreement step to agree a quantum key directly with the targeted node. Having established a quantum key with the current targeted node the method can be repeated but with the next node in the network path as the targeted node until a destination node is reached. The final quantum key agreed with the destination node can then be used for encrypting communication between those nodes across the network.

20 Claims, 4 Drawing Sheets

(56) References Cited

U.S. PATENT DOCUMENTS

Figure 1:
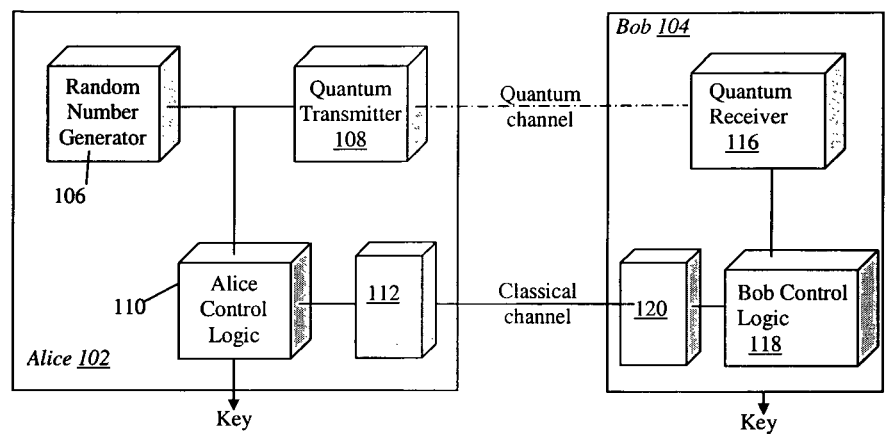

| | | |
|---|---|---|
| 4,691,984 A | 9/1987 | Thaniyavarn |
| 4,775,971 A | 10/1988 | Bergmann |
| 4,807,952 A | 2/1989 | Jaeger et al. |
| 5,150,436 A | 9/1992 | Jaeger et al. |
| 5,157,754 A | 10/1992 | Bierlein et al. |
| 5,166,991 A | 11/1992 | Jaeger et al. |
| 5,410,625 A | 4/1995 | Jenkins et al. |
| 5,428,698 A | 6/1995 | Jenkins et al. |
| 5,479,514 A | 12/1995 | Klonowski |
| 5,481,636 A | 1/1996 | Fukuda et al. |
| 5,566,257 A | 10/1996 | Jaeger et al. |
| 5,757,912 A | 5/1998 | Blow |
| 5,768,378 A | 6/1998 | Townsend et al. |
| 5,878,142 A | 3/1999 | Caputo et al. |
| 5,999,548 A | 12/1999 | Mori et al. |
| 6,028,935 A | 2/2000 | Rarity et al. |
| 6,145,079 A | 11/2000 | Mitty et al. |
| 6,240,514 B1 | 5/2001 | Inoue et al. |
| 6,798,795 B2 | 9/2004 | Yoo |
| 6,806,986 B2 | 10/2004 | Asobe et al. |
| 7,068,790 B1 | 6/2006 | Elliott |
| 7,155,078 B2 | 12/2006 | Welch et al. |
| 7,162,107 B2 | 1/2007 | Bull et al. |
| 7,181,114 B2 | 2/2007 | Lee et al. |
| 7,242,775 B2 | 7/2007 | Vig et al. |
| 7,242,821 B2 | 7/2007 | Bull et al. |
| 7,248,695 B1 | 7/2007 | Beal et al. |
| 7,274,791 B2 | 9/2007 | Van Enk |
| 7,289,688 B2 | 10/2007 | Bull et al. |
| 7,430,295 B1 | 9/2008 | Pearson et al. |
| 7,457,416 B1 | 11/2008 | Elliott |
| 7,460,670 B1 | 12/2008 | Elliott |
| 7,515,716 B1 | 4/2009 | Elliott |
| 7,515,801 B2 | 4/2009 | McCaughan et al. |
| 7,596,318 B2 * | 9/2009 | Han et al. ............ 398/69 |
| 7,627,126 B1 | 12/2009 | Pikalo et al. |
| 7,646,873 B2 | 1/2010 | Lee et al. |
| 7,706,535 B1 | 4/2010 | Pearson et al. |
| 7,760,883 B2 * | 7/2010 | Kuang ............ 380/278 |
| 7,864,958 B2 | 1/2011 | Harrison et al. |
| 7,865,048 B2 | 1/2011 | McCaughan et al. |
| 8,488,790 B2 | 7/2013 | Wellbrock et al. |
| 2002/0025046 A1 | 2/2002 | Lin |
| 2002/0087862 A1 | 7/2002 | Jain et al. |
| 2003/0210912 A1 | 11/2003 | Leuthold et al. |
| 2003/0214991 A1 | 11/2003 | Wiedmann et al. |
| 2004/0034776 A1 | 2/2004 | Fernando et al. |
| 2004/0109564 A1 | 6/2004 | Cerf et al. |
| 2004/0184603 A1 * | 9/2004 | Pearson et al. ............ 380/28 |
| 2004/0184615 A1 | 9/2004 | Elliott et al. |
| 2004/0252957 A1 | 12/2004 | Schmidt et al. |
| 2005/0078826 A1 | 4/2005 | Takeuchi |
| 2005/0135620 A1 | 6/2005 | Kastella et al. |
| 2005/0190921 A1 | 9/2005 | Schlafer et al. |
| 2005/0249352 A1 | 11/2005 | Choi et al. |
| 2005/0259825 A1 | 11/2005 | Trifonov |
| 2005/0286723 A1 | 12/2005 | Vig et al. |
| 2006/0002563 A1 | 1/2006 | Bussieres et al. |
| 2006/0031828 A1 | 2/2006 | Won et al. |
| 2006/0059343 A1 | 3/2006 | Berzanskis et al. |
| 2006/0062392 A1 | 3/2006 | Lee et al. |
| 2006/0067603 A1 | 3/2006 | Bull et al. |
| 2006/0083379 A1 | 4/2006 | Brookner |
| 2006/0290941 A1 | 12/2006 | Kesler et al. |
| 2007/0014415 A1 | 1/2007 | Harrison et al. |
| 2007/0016534 A1 | 1/2007 | Harrison et al. |
| 2007/0065154 A1 | 3/2007 | Luo et al. |
| 2007/0065155 A1 | 3/2007 | Luo et al. |
| 2007/0071245 A1 | 3/2007 | Kuang |
| 2007/0074277 A1 | 3/2007 | Tofts et al. |
| 2007/0076884 A1 | 4/2007 | Wellbrock et al. |
| 2007/0101410 A1 | 5/2007 | Harrison et al. |
| 2007/0104443 A1 | 5/2007 | Helmy |
| 2007/0122097 A1 | 5/2007 | Schmidt et al. |
| 2007/0123869 A1 | 5/2007 | Chin et al. |
| 2007/0130455 A1 | 6/2007 | Elliott |
| 2007/0133798 A1 | 6/2007 | Elliott |
| 2007/0160201 A1 | 7/2007 | Blom et al. |
| 2007/0177735 A1 | 8/2007 | Mimih et al. |
| 2007/0192598 A1 | 8/2007 | Troxel et al. |
| 2008/0003104 A1 | 1/2008 | Betlach |
| 2008/0013738 A1 | 1/2008 | Tajima et al. |
| 2008/0031456 A1 | 2/2008 | Harrison et al. |
| 2008/0144836 A1 | 6/2008 | Sanders et al. |
| 2008/0147820 A1 | 6/2008 | Maeda et al. |
| 2008/0175385 A1 | 7/2008 | Lee et al. |
| 2008/0292095 A1 | 11/2008 | Vig et al. |
| 2008/0317423 A1 | 12/2008 | Stepanov et al. |
| 2009/0016736 A1 | 1/2009 | Beal et al. |
| 2009/0074192 A1 | 3/2009 | Beal et al. |
| 2009/0106551 A1 | 4/2009 | Boren et al. |
| 2009/0175452 A1 | 7/2009 | Gelfond et al. |
| 2009/0316910 A1 | 12/2009 | Maeda et al. |
| 2010/0098252 A1 | 4/2010 | Kanter et al. |
| 2010/0226659 A1 | 9/2010 | Nishioka et al. |
| 2010/0290626 A1 | 11/2010 | Jenkins et al. |
| 2010/0293380 A1 | 11/2010 | Wiseman et al. |
| 2010/0299526 A1 | 11/2010 | Wiseman et al. |
| 2010/0329459 A1 | 12/2010 | Wiseman et al. |

FOREIGN PATENT DOCUMENTS

| | | |
|---|---|---|
| EP | 1 503 328 A1 | 2/2005 |
| EP | 2 081 317 A2 | 6/2005 |
| EP | 1 605 287 A2 | 12/2005 |
| EP | 1 633 076 A1 | 3/2006 |
| EP | 1 643 663 A1 | 5/2006 |
| EP | 1 833 009 A1 | 9/2007 |
| EP | 1 848 142 A2 | 10/2007 |
| EP | 1 865 656 A1 | 12/2007 |
| EP | 2 003 812 A2 | 12/2008 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-2005-117511 | 4/2005 |
| JP | A-2005-268958 A | 9/2005 |
| JP | A-2006-507735 | 3/2006 |
| JP | A-2006-203559 | 8/2006 |
| JP | A-2007-19789 | 1/2007 |
| JP | A-2007-500370 A | 1/2007 |
| JP | A-2007-053591 | 3/2007 |
| JP | A-2007-129562 | 5/2007 |
| WO | WO 92/11550 A1 | 7/1992 |
| WO | WO 92/11551 A1 | 7/1992 |
| WO | WO 92/11554 A1 | 7/1992 |
| WO | WO 92/11555 A1 | 7/1992 |
| WO | WO 95/07582 A1 | 3/1995 |
| WO | WO 97/44936 A1 | 11/1997 |
| WO | WO 02/15626 A1 | 2/2002 |
| WO | WO 03/015370 A2 | 2/2003 |
| WO | WO 03/065091 A2 | 8/2003 |
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |
| WO | WO 2006/031828 A2 | 3/2006 |
| WO | WO 2006/134290 A2 | 12/2006 |
| WO | WO 2007/023286 A1 | 3/2007 |
| WO | WO 2007/105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |
| WO | WO 2009/141587 A1 | 11/2009 |

(56) References Cited

FOREIGN PATENT DOCUMENTS

| WO | WO 2010/049673 A1 | 5/2010 |
|---|---|---|
| WO | WO 2010/064003 A1 | 6/2010 |
| WO | WO 2010/064004 A1 | 6/2010 |

OTHER PUBLICATIONS

Stucki et al., "Quantum Key Distribution Over 67km With Plug &Play System," New Journal of Physics 4, pp. 41.1-41.8, 2002.
Jun. 1, 2011 International Search Report issued in Application No. PCT/GB2010/001811.
Jun. 1, 2011 Written Opinion issued in Application No. PCT/GB2010/001811.
Toliver P., et al. "Demonstration of 1550 nm QKD with ROADM-based DWDM Networking and the Impact of Fiber FWM," 2007 Conference on Lasers and Electro-Optics, May 5-11, 2007, Baltimore, MD, Optical Society of America, May 6, 2007, pp. 1-2, XP031231023.
Bechmann-Pasquinucci et al., "Quantum key distribution with trusted quantum relay," May 12, 2005, pp. 1-13, <http://arxiv.org/PS_cache/quant-ph/pdf/0505/0505089v1.pdf>.
Bennett et al., "Quantum Cryptography: Public Key Distribution and Coin Tossing," International Conference on Computers, Systems & Signal Processing, Dec. 10-12, 1984, pp. 1-5, Bangalore, India.
Duligall et al., "Low cost and compact quantum key distribution," New Journal of Physics 8, 249, pp. 116, 2006.
Elliott, "Building the quantum network," New Journal of Physics 4, pp. 46.1-46.12, 2002, XP-002271991.
Fernandez et al., "Gigahertz Clocked Quantum Key Distribution in Passive Optical Networks," Leos Summer Topical Meetings, 2006 Digest of the Quebec City, Canada, Jul. 17, 2006, pp. 36-37, XP-010940123.
Fernandez et al., "Passive Optical Network Approach to GigahertzClocked Multiuser Quantum Key Distribution," Journal of Quantum Electronics, vol. 43, No. 2, pp. 130-138, Feb. 2007.
Brassard et al., "Multi-User Quantum Key Distribution Using Wavelength Division Multiplexing," pp. 1-5, XP-002534322, <http://citeseerx.ist.psu.edu/viewdoc/download?doi=10.1.1.87.378&rep=rep1&type=pdf>.
Gordeev et al., "Tunable electro-optic polarization modulator for quantum key distribution applicators," Optics Communications, vol. 234, pp. 203-210, 2004.
Horikiri et al., "Quantum key distribution with a heralded single photon source," International Quantum Electronics Conference, 2005, pp. 1617-1618, Jul. 11, 2005.
Lee et al., "Quantum Authentication and Quantum Key Distribution Protocol," Jan. 11, 2006,pp. 1-8, <http://arxiv.org/PS_cache/quant-ph/pdf/0510/0510144v2.pdf>.
Rao et al., "Nonlinear frequency conversion in semiconductor optical waveguides using birefringent, modal and quasiphase-matching techniques," Journal of Optics A: Pure and Applied Optics, vol. 6, pp. 569-584, 2004.
Karlsson et al., "Authority-based user authentication in quantum key distribution," Physical Review A, vol. 62, pp. 022305-1-022305-7, 2000, XP-002534291.
Kuhn, "A Quantum Cryptographic Protocal with Detection of Compromised Server," Quantum Information and Computation, vol. 5, No. 7, pp. 551-560, 2005, XP-002520284.
Kumavor et al., "Comparison of Four Multi-User Quantum Key Distribution Schemes Over Passive Optical Networks," Journal of Lightwave Technology, vol. 23, No. 1, pp. 268-276, Jan. 2005, XP-001227328.
Malis et al., "Improvement of second-harmonic generation in quantum-cascade lasers with true phase matching," Applied Physics Letters, vol. 84, No. 15, pp. 2721-2723, Apr. 12, 2004.
Mašamović et al., "Design and Performance of a Monolithically Integrated Widely Tunable All-Optical Wavelength Converter With Independent Phase Control," IEEE Photonics Technology Letters, vol. 196, No. 10, pp. 22992301, Oct. 2004.
Menezes, Handbook of Applied Cryptography, Chapter B Key Management Techniques, CRC Press LLC, pp. 547-553, 1997, XP-002520285.
Nambu et al., "BB84 Quantum Key Distribution System based on Silica-Based Planar Lightwave Circuits," Apr. 22, 2008, pp. 1-11, <http://arxiv.org/PS_cache/quant-ph/pdf/0404/0404015.pdf>.
Hwang et al., "Provably Secure Three-Party Authenticated Quantum Key Distribution Protocols," IEEE Transactions on Dependable and Secure Computing, vol. 4, No. 1, pp. 71-80, Jan.-Mar. 2007.
Mo et al., "Quantum key distribution network with wavelength addressing," Oct. 15, 2006, pp. 1-11, <http://arxiv.org/PS_cache/quant-ph/pdf/0610/0610096v2.pdf>, XP-002534290.
Nguyen et al., "802.11i Encryption Key Distribution Using Quantum Cryptography," Journal of Networks, vol. 1, No. 5, pp. 9-20, Sep./Oct. 2006, XP-002576733.
Moutzouris et al., "Second Harmonic Generation in GaAs/AIGaAs Waveguides With Femtosecond Pulses Near 1.55 μm Using Modal Phase Matching Technique," Lasers and Electro-Optics Europe, 2003 Conference Munich, Germany, Jun. 22-27, 2003, XP-010710252.
Jäger et al., "Modal dispersion phase matching over 7 mm length in overdamped polymeric channel waveguides," Applied Physics Letters, vol. 69, No. 27, pp. 4139-4141, Dec. 30, 1996.
Yin et al., "Integrated ARROW waveguides with hollow cores," Optics Express, vol. 12, No. 12, pp. 270-2715, Jun. 14, 2004, XP-002363659.
Yariv, "Coupled-Mode Theory for Guided-Wave Optics," IEEE Journal of Quantum Electronics, vol. QE-9, No. 9, pp. 919-933, Sep. 1973.
Rahmatian, "An Ultrahigh-Speed AIGaAs-GaAs Polarization Converter Using Slow-Wave Coplanar Electrodes," IEEE Photonics Technology Letters, vol. 10, No. 5, pp. 675-677, May 1998.
Finlayson et al., "Polarization Conversion in Passive Deep-Etched GaAs/AIGaAs Waveguides," Journal of Lightwave Technology, vol. 24, No. 3, pp. 1425-1432, Mar. 2006, XP-002459136.
Grossard et al., "AIGaAs-GaAs Polarization Converter with Electrooptic Phase Mismatch Control," IEEE Photonics Technology Letters, vol. 13, No. 8, pp. 830-832, Aug. 2001.
Hall et al., "Optical Guiding and Electro-Optic Modulation in GaAs Epitaxial Layers, "Optics Communications, vol. 1, No. 9, pp. 403-405, Apr. 1970.
Haxha et al., "Analysis of polarization conversion in AIGaAs/GaAs electrooptic polarization converter," Optics Communications, vol. 262, pp. 47-56, 2006, XP-002459135.
Heaton et al., "Optimization of Deep-Etched, Single-Mode GaAs/AIGaAs Optical Waveguides Using Controlled Leakage into the Substrate," Journal of Lightwave Technology, vol. 17, No. 2, pp. 267-281, Feb. 1999.
Izuhara et al., "Low-voltage tunable TE/TM converter on ion-sliced lithium niobate thin film," Electronic Letters, vol. 39, No. 15, Jul. 24, 2003.
Schlak et al., "Tunable TE/TM-Mode Converter on (001)-InP-Substrate," IEEE Photonics Technology Letters, vol. 3, No. 1, pp. 15-16, Jan. 1991.
Wang et al., "High Speed III-V Electooptic Waveguide Modulators at λ=1.3 μm," Journal of Lightwave Technology, vol. 6, No. 6, pp. 758-771, Jun. 1988.
Mar. 31, 2009 International Search Report issued in Application No. PCT/GB2009/000190.
Mar. 31, 2009 Written Opinion issued in Application No. PCT/GB2009/000190.
May 16, 2008 British Search Report issued in Application No. GB0801408.6.
Jul. 14, 2009 International Search Report issued in Application No. PCT/GB2009/000189.
Jul. 14, 2009 Written Opinion issued in Application No. PCT/GB2009/000189.
Aug. 3, 2010 International Preliminary Report on Patentability issued in Application No. PCT/GB2009/000179.
Jun. 2, 2009 International Search Report issued in Application No. PCT/GB2009/000179.
Jun. 2, 2009 Written Opinion issued in Application No. PCT/GB2009/000179.

(56) References Cited

OTHER PUBLICATIONS

Apr. 24, 2008 British Search Report issued in Application No. GB0801492.0.
Jul. 28, 2009 International Search Report issued in Application No. PCT/GB2009/000186.
Jul. 28, 2009 Written Opinion issued in Application No. PCT/GB2009/000186.
May 21, 2008 British Search Report issued in Application No. GB0801395.5.
Jul. 14, 2009 International Search Report issued in Application No. PCT/GB2009/001223.
Jul. 14, 2009 Written Opinion issued in Application No. PCT/GB2009/001223.
Jul. 14, 2009 International Search Report issued in Application No. PCT/GB2009/001226.
Jul. 14, 2009 Written Opinion issued in Application No. PCT/GB2009/001226.
Jul. 6, 2009 International Search Report issued in Application No. PCT/GB2009/001222.
Jul. 6, 2009 Written Opinion issued in Application No. PCT/GB2009/001222.
U.S. Appl. No. 12/993,146, filed Nov. 17, 2010; Hicks.
U.S. Appl. No. 12/993,098, filed Nov. 17, 2010; Wiseman et al.
U.S. Appl. No. 12/992,695, filed Nov. 15, 2010; Wiseman.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.
Rass, S., "A Method of Authentication for Quantum Networks," Proceedings of World Academy of Science, Engineering and Technology, vol. 12, (2006).
Oct. 4, 2012 Office Action issued in U.S. Appl. No. 12/992,695.
Oct. 29, 2012 Office Action issued in U.S. Appl. No. 12/993,146.
Nov. 8, 2012 Office Action issued in U.S. Appl. No. 12/863,510.
Nov. 9, 2012 Office Action issued in U.S. Appl. No. 13/130,790.
Benabid, "Hollow-core Photonic Bandgap Fibre: New Light Guidance for New Science and Technology," Philosophical Transactions of the Royal Society, 2006, pp. 3439-3462, vol. 364, Bath, U.K.
Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any 2 Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computational Loads and Rates in Practical Quantum Cryptography," Algorithmica, 2002, pp. 314-339, vol. 34, US.
Kanamori et al., "3 Party Quantum Authenticated Key Distribution with Partially Trusted Third Party," IEEE Communications Society, 2008, Globecom 2008 Proceedings.
Le et al. "Enhancement of AGT Telecommunication Security using Quantum Cryptography," Ecole Nationale Superieure des Telecommunications, Eurocontrol CARE Project, QCRYPT, France.
Lütkenhaus, "Estimates for Practical Quantum Cryptography," Helsinki Institute of Physics, Feb. 1, 2008, pp. 1-26, Helsinki, Finland.
Aug. 13, 2008 Search Report issued in International Application No. GB0809038.3.
Aug. 13, 2008 Search Report issued in International Application No. GB0809044.1.
Aug. 14, 2008 Search Report issued in International Application No. GB0809045.8.
Jan. 23, 2009 Search Report issued in International Application No. GB0819665.1.
Mar. 18, 2009 Search Report issued in International Application No. GB0822356.2.
Mar. 16, 2009 Search Report issued in International Application No. GB0822254.9.
Mar. 16, 2009 Search Report issued in International Application No. GB0822253.1.
Jan. 25, 2010 Search Report issued in International Application No. GB0917060.6.
Jun. 29, 2010 Search Report issued in International Application No. GB0917060.6.
Mar. 25, 2010 Search Report and Written Opinion issued in International Application No. PCT/GB2009/002543.
Jan. 4, 2010 Search Report and Written Opinion issued in International Application No. PCT/GB2009/002745.
Sep. 30, 2010 Search Report and Written Opinion issued in International Application No. PCT/GB2009/002802.
Apr. 20, 2010 Search Report and Written Opinion issued in International Application No. PCT/GB2009/002801.
May 31, 2012 Search Report and Written Opinion issued in International Application No. PCT/GB2011/001670.
Aug. 1, 2012 Office Action issued in U.S. Appl. No. 12/993,098.
Sep. 12, 2012 Office Action issued in U.S. Appl. No. 12/863,509.
Jun. 21, 2012 Office Action issued in U.S. Appl. No. 12/863,510.
U.S. Appl. No. 13/496,324 in the name of Ayling, filed Mar. 15, 2012.
U.S. Appl. No. 13/130,944 in the name of Benton, filed May 24, 2011.
U.S. Appl. No. 13/130,897 in the name of Wiseman, filed May 24, 2011.
U.S. Appl. No. 13/130,790 in the name of Wiseman, filed May 24, 2011.
U.S. Appl. No. 13/125,735 in the name of Wiseman, filed Apr. 22, 2011.
U.S. Appl. No. 12/863,509 in the name of Jenkins et al., filed Jul. 19, 2010.
Sep. 21, 2012 Office Action issued in U.S. Appl. No. 12/812,849.
Apr. 11, 2013 Office Action issued in U.S. Appl. No. 13/130,994.
Mar. 13, 2013 Office Action issued in U.S. Appl. No. 12/992,695.
Ibrahim et al. "Simulation of Static Optical XPM in Active MMI Couplers" (published in International Conference on Numerical Simulation of Optoelectronic Devices, Sep. 2007), pp. 95-96.
Jul. 3, 2013 Office Action issued in U.S. Appl. No. 12/993,098.
Jun. 28, 2013 Office Action issued in U.S. Appl. No. 13/130,790.
Jun. 19, 2013 Notice of Allowance issued in U.S. Appl. No. 12/993,146.
Jun. 11, 2013 Office Action issued in U.S. Appl. No. 12/863,509.
Jul. 8, 2013 Office Action issued in U.S. Appl. No. 13/496,324.
Aug. 29, 2013 Office Action issued in U.S. Appl. No. 12/992,695.
Sep. 12, 2013 Office Action issued in U.S. Appl. No. 13/130,897.
Sep. 18, 2013 Office Action issued in U.S. Appl. No. 12/812,849.
Nov. 5, 2013 Office Action issued in U.S. Appl. No. 12/863,510.
Lijun Ma, "Experimental Demonstration of an Active Quantum Key Distribution Network with Over Gbps Clock Synchronization," IEEE Communications Letters, vol. 11, No. 12, Dec. 2007, pp. 1019-1021.
Nov. 7, 2013 Office Action issued in U.S. Appl. No. 12/993,098.
May 10, 2013 Office Action issued in U.S. Appl. No. 13/130,897.

* cited by examiner

NETWORK HAVING QUANTUM KEY DISTRIBUTION

This invention relates to apparatus and method for performing quantum cryptography, especially quantum key distribution, across a network.

Encryption is commonly used to protect communications over a variety of media, especially communication networks and/or data networks. Encryption is generally based on the parties who wish to protect their communication sharing some secret value. This value may be used to derive a cryptographic key which is used to protect the communication. The more sophisticated the encryption the harder it is to decode without the key—it is generally believed that breaking modern, well administered encryption schemes would require vast conventional computing resources. It is well known however that using the same cryptographic key repeatedly for different communications gives a possible codebreaker more material to work with and potentially introduces vulnerabilities into the encryption. Therefore changing the cryptographic key often is desirable.

Obviously distributing new key material securely is vital as, with knowledge of the key, an eavesdropper can decrypt all communications. Key distribution must also be efficient and convenient however, for instance physical delivery of new keys by trusted courier or the like, is expensive and impractical for many situations.

New key material may be distributed by encrypting it using the existing key and then distributing as normal data traffic. The new key material can then be used for subsequent communications—including, at some point, another new key. Such a scheme is convenient and allows regular key update but it has a weakness in that if the encryption is broken at any point, i.e. the encryption key is effectively determined, it fails from that point on as an eavesdropper will be able to intercept and decode the message bearing the new key when it is distributed.

Quantum key distribution (QKD) is a well known technique which offers the possibility of secure key distribution. QKD relies on fundamental quantum properties and allows two parties, commonly referred to as Alice and Bob, to exchange a value and know that an eavesdropper, usually referred to as Eve, has not learnt much about the value. QKD allows key material to be securely derived by Alice and Bob as needed, which offers significant advantages over other methods of key distribution.

Bennett and Brassard described a QKD protocol in C. H. Bennett and G. Brassard, "Quantum cryptography: 'Public key distribution and coin tossing'," IEE Conf. Computers Systems Signal Processing, Bangalore, India 1984 which has become known as the BB84 protocol. This protocol uses the transmission of a suitably encoded series of single photons (a quantum exchange) followed by an open discussion via any conventional communication medium (a key agreement stage) to allow Alice and Bob to derive a shared string of random numbers. As single photons are used in the quantum exchange the only way Eve can gain any information about this exchange is to intercept the single photons sent by Alice and measure the information herself. To avoid detection she should also transmit a photon to Bob which attempts to replicate the original photon she intercepted. Due to the random choice of encoding and the quantum nature of the photons Eve can not guarantee to pass a correctly encoded photon to Bob and this will generate a statistical error which will be spotted by Alice and Bob during their conventional communication.

QKD therefore offers a secure means of distributing new key material which protects against eavesdropping. The BB84 protocol as originally described is however potentially vulnerable to a so called man-in-the-middle attack. Here an attacker, usually referred to as Mallory, positions himself so as to be able to intercept and stop all data exchange between Alice and Bob. Mallory then communicates with Alice but pretends to Ace that he is Bob. He also communicates with Bob but in doing so pretends to be Alice. Thus each of Alice and Bob think they are talking to one another but in fact they are actually both talking to Mallory. Were simple QKD protocols used in this scenario Alice would agree a quantum key, i.e. a key derived through QKD, with Mallory (thinking it was Bob). Bob would likewise agree a quantum key with Mallory. Alice, thinking she had agreed a quantum key with Bob would encrypt a message meant for Bob with this key. Mallory could intercept this communication, decrypt it and take any information he wants from the message. To avoid detection he can then re-encrypt this message, this time using the quantum key agreed with Bob, and transmit it onward to Bob. Bob would therefore receive the message which was actually sent by Alice and it would be encrypted using the key he thinks he has agreed with Alice. Bob would therefore not realise anything was wrong. Communications from Bob to Alice would follow the same principle in reverse order.

To overcome the man-in-the-middle attack it is usual for the communicating parties to undertake an authentication step to ensure that Alice is indeed talking to Bob and not to Mallory. Authentication usually involves revealing or using a shared secret, such as an identity key, which is known only to Bob and Alice. Alice, wishing to communicate with Bob, would attempt to contact Bob and set up a quantum key. In doing so she requests authentication based on Bob's identity key. Mallory would not know this and hence could not successfully pretend to be Bob. Similarly Bob, receiving a request to set up a quantum key with someone purporting to be Alice, would request authentication based on Alice's identity key. Authentication does require Alice and Bob to share knowledge of at least one identity key prior to commencing QKD but this key can be supplied once on initialisation of the system. In use the identity key can then be updated using a quantum key derived from an authenticated QKD session.

Authenticated QKD therefore offers secure key distribution. QKD as described however requires an uninterrupted optical path from Alice to Bob to act as a quantum channel. This may be in free space or through an optical waveguide such as a fibre optic cable. In either case distances are limited, not least due to the use of single photons. Further in a network having a large number of connected users it will impractical for each user to have a direct optical link with each other user.

One way of overcoming this limitation would be to have a network of nodes. To communicate from Alice to Bob a chain of nodes could be formed, each node being connected to the next node by an optical link over which QKD can be applied. Alice would be the first node in the chain and Bob the last. Each node could then establish a quantum key by QKD with its neighbours. The key established by a pair of nodes would then be used to encrypt data traffic passing between those nodes. In this way a message passing along the chain is encrypted between nodes, though a different key is used on each link. This provides protection against Eve attempting to eavesdrop on any link. However it will be clear that the data is in the clear, i.e. unencrypted, within a node and hence it is necessary to protect against Mallory pretending to be a node in the chain. This requires each node to authenticate the adjacent nodes in the chain.

Whilst such an arrangement is possible it does require Alice and Bob to trust the nodes to establish the correct path through the network and to authenticate correctly. Also it requires each node to know its own identity key and the identity keys of the previous and subsequent nodes in a chain. As the skilled person will appreciate, the nodes must be physically secured, i.e. proof against leaking data accidentally and also in a secure location and/or tamper proof. Tamper proofing of such devices often involves locating it in a screened container which, if opened, causes the node to irretrievably delete all keys known to it. This occurs if an attacker attempts to open the container but also if the container is opened for routine maintenance. After maintenance a new identity key is loaded into the node which it can then use to communicate with its adjacent node. However these nodes will not recognise the new identity key unless they have also been physically supplied with it. It will be apparent then any maintenance carried out on a node, or replacement of a node in the chain, will require an engineer to not only visit that node but also the locations of all nodes to which the particular node may communicate. This represents an additional management overhead which should be avoided if possible.

An alternative arrangement is disclosed in US patent application US2004/0184603, Pearson and Elliot. Here nodes are dynamically picked from a network to form a chain from Alice to Bob and QKD is used between each node to generate a quantum key for that link. However, unlike the arrangement described above, traffic data is not sent through the chain encrypted with a different quantum key on each link. Instead each intermediate node in the chain combines the quantum keys it shares with the nodes either side via an XOR function and passes the result to Alice via conventional communication methods. Bob, the last node in the chain, generates a traffic key and combines this with the quantum key established with the previous node and sends this to Alice. Alice can combine the data sent by each of the nodes in the chain together with the quantum key she agreed with the node adjacent to her to recover the traffic key. The traffic key can then be used for end-to-end encryption between Alice and Bob. In effect each node sends Alice the quantum key for the subsequent link encrypted with the key for the previous link. As Alice herself knows the quantum key for the first link she can use this to decode the key for the second link which can be used to decode the key for the third link and so on till she knows the quantum key for the last link which Bob had used to encrypt the traffic key.

Eve monitoring the traffic in such a system will be able to combine the data sent by each node to generate a value which is equal to the traffic key combined with the quantum key for the first link by an XOR function. As Eve does not know that quantum key she can't know the traffic key and hence the system is secure against eavesdropping. Whilst the data traffic is sent using end-to-end encryption—and hence does not appear in the clear at any node—any node could derive the traffic key by simply collecting all the messages sent by conventional means by each subsequent node in the chain and combining them via an XOR function. Hence the system is still vulnerable to Mallory pretending to be a node and thus each node must authenticate the next node in the chain to maintain security. This need for nodes to authenticate each other has the same disadvantages as described above.

Further Alice must trust the nodes to establish links with the correct Bob. If any of the nodes, for instance the first node which is generally responsible for establishing the path, malfunctions and establishes a path to someone else (an incorrect Bob) a key will be established with that incorrect Bob. The message would then be sent securely over the network but would arrive at the wrong recipient in a form they could read.

Another technique is disclosed by Bechmann-Pasquinucci and Pasquinucci in their paper entitled "Quantum key distribution with trusted quantum relay". Here Alice and Bob at the end point nodes communicate via an intermediate node, Trent. Trent has a quantum receiver that receives the quantum signal from Alice and a quantum transmitter that attempts to regenerates the quantum signal which passes to Bob. In effect Trent attempts to act as an automatic relay or signal booster. As however Trent can not guarantee to regenerate the quantum signal accurately—which is fundamental to the security of QKD—all three parties, Alice, Trent and Bob must discuss the bases used to generate and measure the photons in the key agreement stage. Only if all three agree is the bit retained. The algorithm generalises to chains with more than three nodes in an obvious fashion.

The paper makes it clear that Trent must be trusted, because it has all information necessary to derive the key that Alice and Bob establish. The paper does not discuss the need for authentication to exclude man-in-the-middle attacks, but it is clear that Alice and/or Bob must authenticate Trent otherwise a man-in-the-middle attacker, Mallory, could replace it.

One drawback of this solution is that losses increase exponentially with the number of nodes in the chain, because Bob and each Trent must all guess the base used by Alice correctly. This problem is compounded by a practical problem with current quantum transmitters. The transmitter must be a single photon source otherwise Eve can intercept one photon and leave another unobserved to pass to Bob. The practical means of producing single photon sources is to use low power lasers which statistically have a very low probability of producing multiple photons, but have quite a high probability of producing none. Thus the quantum transmitters are a large source of loss in the quantum signal. For example, Alice might attempt to send photons at a rate of 10 Mbit/second, but on average only 1 Mbits are actually sent every second. Trent must receive and then resend these using a single photon source, so actually only sends 100 kbits every second. This greatly reduces the rate at which keys can be established, and the losses soon become so high that it is no longer possible to establish a key at all.

An alternative approach is described in Magiq's published PCT patent application WO2007/123869. Here a number of users are connected to one another by traditional communication links. In addition users may be connected to a quantum key certificate authority by a quantum link. The quantum links are used for QKD between the certificate authority and the user. Two users wishing to communicate are each then sent the same key by the certificate authority using the respective quantum keys established. This arrangement however requires each user to have a direct quantum link to the certificate authority, which may not be possible or practical in some network implementations. Further the certificate authority must be trusted to correctly identify the two users who wish to communicate to send them the common key and the certificate authority must also be trusted with authentication.

BBN Technologies U.S. Pat. No. 7,068,790 teaches that a switched optical network can be enabled incorporating MEMS switches to provide a switchable optical path through a network. In this way an optical path through the network can be established to allow end to end QKD between any two endpoints. Such a switched arrangement does however introduce additional complexity into the network and the QKD apparatus would most likely shorten the effective distance over which quantum signals could be sent.

It is therefore an object of the present invention to provide a network using QKD which mitigates at least some of the above mentioned disadvantages.

Thus according to the present invention there is provided a method of quantum key distribution between a first node and a second node over an optical network via a network path comprising at least one intermediate node comprising the step of agreeing' a quantum key between the first node and each subsequent node in the network path in sequence until a quantum key is agreed with the second node, wherein the step of agreeing a quantum key with a targeted node comprises the steps of exchanging a quantum signal between the targeted node and the previous node in the network path and performing a key agreement step between the first node and the targeted node based on said quantum signal wherein, where the first node is not itself involved in said quantum exchange, it communicates with said node previous to the targeted node such that it has all information necessary for the key agreement step, said communication being encrypted using the quantum key established with said previous node.

The present invention therefore allows first and second nodes of an optical network to agree a quantum key directly using the principles of quantum key distribution, even when the first and second nodes are linked by a network path that includes at least one intermediate node and thus may not have a direct optical link between them. The present invention operates by having the first node in the path, which may also be referred to as a source node, establish a separate quantum key with each node in the path in turn until a key is agreed with the second node, i.e. the destination node. Once a quantum key has been directly agreed with the destination node it can be used for end-to-end encryption of communications between the source and destination nodes. Note that as used herein the term node means a location in the optical network which has at least one apparatus capable of transmitting and/or receiving a quantum signal suitable for quantum key distribution. A node may be an endpoint of a network or an intermediate part of the network.

The method operates sequentially in agreeing a quantum key with each node in the path in turn, starting with the node adjacent the first node. It operates in this fashion because each quantum key established with one node is used in the step of agreeing the quantum key with the subsequent node in the path. Note that as used in this specification the term targeted node means the node with which the first node is attempting to agree a key with in any particular step. Thus it will be clear that each intermediate node in the network path will be a targeted node in turn before the second node, the destination node, becomes the targeted node in the final iteration.

The step of agreeing a quantum key with any targeted node involves that targeted node exchanging a quantum signal with another node as is normal in QKD. A quantum signal is any signal which may be used as the basis of a quantum key agreement protocol as would be understood by one skilled in the art. For instance the quantum signal may comprise a series of suitably modulated single photons. The skilled person will be well aware of various modulation schemes which may be used for instance, without limitations signals based on the BB84 protocol or the B92 protocol or the six-state protocol or any of their variants. The modulation may for instance apply phase modulation or polarisation modulation. The quantum signal could also comprise entangled photons. For instance a source of entangled photons may generate an entangled photon pair and one of these photons may be sent across a suitable link. Thus the quantum exchange of the quantum signal may include transfer of an entangled photon. It is possible that a source of entangled photon pairs is located remotely and one photon from each pair is provided to Alice and Bob. It will be understood by the skilled person that in such an arrangement the quantum signal exchange occurs when Alice and Bob each perform measurements on their respective photons. Hence even though a third party may generate the entangled photons the quantum exchange is still between Alice and Bob.

Consider the method applied to QKD between a source node (the first node) and destination node (the second node) linked by a single intermediate node. In the first iteration of the method the intermediate node is the targeted node. The method involves a quantum exchange between the targeted node and the previous node in the path—which in this first iteration is the source node. Typically one node would have transmitted the quantum signals and would therefore be referred to as Alice and the other node would have received the quantum signals and would be referred to as Bob. Following the quantum exchange there is a key agreement step between the source node and the targeted node—which is carried out using conventional communications. In this first iteration therefore the source node discusses with the intermediate node the quantum signals exchanged between them, i.e. Alice and Bob engage in a discussion as in normal QKD. As an example, were the quantum signal exchange carried out in accordance with the principles of quantum exchange set out in the BB84 protocol, i.e. the quantum signal consists of a series of single photons, each randomly modulated in terms of encoding base and data value then the key agreement step could also follow the principles of BB84, i.e. Alice and Bob identify the photons for which they both used the same encoding bases and use the measured data values for such photons to check for eavesdropping and then in agreeing a quantum key. The skilled person will of course appreciate that the BB84 protocol is used by way of example only and other protocols exist and could be adapted to operate according to the present invention.

The source node, i.e. the first node, can therefore also authenticate with the intermediate node as is usual in QKD.

The first iteration therefore establishes a first quantum key between the source node and the intermediate using standard QKD principles. In the next iteration however the source node attempts to agree a new quantum key, a second quantum key, directly with the destination node, to which it may not have a direct optical link.

In this iteration the quantum exchange occurs between the targeted node, which is the destination node, and the previous node in the path, which is the intermediate node.

This quantum exchange is conveniently the same type of quantum exchange as used in the previous iteration, i.e. it may again be a series of suitably modulated single photons as in standard QKD. However in this iteration, unlike in conventional QKD, the intermediate node, which was involved in the quantum exchange, does not take part in the subsequent key agreement step. Instead the intermediate node communicates with the source node such that the source node has all the information about the quantum signal needed such that it can undertake the subsequent key agreement step. Using the example of the BB84 protocol again the source node communicates with the intermediate node, which was involved in the quantum exchange on this iteration, such that the first node knows the encoding base applied and data value for each photon transmitted and/or detected by the intermediate node. The source node thus has all the information required to undertake the key agreement stage of the BB84 protocol directly with the targeted node.

The source node can therefore agree the second quantum key with the destination node even in the absence of a direct quantum link between them by using an intermediate node. It will be noted that as the source node takes part in the key agreement step the source node, and not the intermediate node, is involved in authenticating the key exchange, i.e. it will be the identity key(s) shared between the source node and the destination node which is/are used for authentication. The intermediate node does not need to authenticate the quantum exchange part with the destination node and hence does not need the identity key for the destination node.

The communication between the source node and the intermediate node regarding the quantum signal sent or received by the intermediate node is protected by the first quantum key established between the source node and intermediate node in the first iteration. Thus this communication is secure against eavesdropping and man-in-the-middle attacks.

Once the second quantum key has been agreed between the source node and the destination node that key can be used to encrypt communications between those nodes in an end-to-end encryption arrangement. This encrypted communication, and that between the source node and the intermediate node, may be performed using any conventional communication apparatus. The encryption may be applied to the communication in any standard way for instance based on symmetric cryptography such as the AES encryption standard or one-time pad encryption. Conveniently each node comprises a crypto-unit, i.e. a device for encrypting and decrypting communications based on cryptographic keys—in this case the first quantum key for exchanges between the source node and the intermediate node which is then replaced by the second quantum key for the end-to-end encryption between the source and destination nodes.

The above description has described a network path comprising a single intermediate node only. It will be apparent however that the invention is applicable to more intermediate nodes. For instance consider that the destination node described in the example above is actually a second intermediate node. This second intermediate node could undergo a quantum exchange with a third intermediate node. The second quantum key established allows secure communication between the source node and what is now the second intermediate node so that the source node can gain all the information it needs to perform a quantum key agreement step with the third intermediate node to agree a third quantum key. The method can be repeated with as many intermediate nodes as required until the destination node is reached. This allows QKD to be applied across a network. However, unlike previous schemes, the method of the present invention allows the source and destination nodes to directly agree a quantum key, even when separated by any number of intermediate nodes and any distance. All that is required is links between the intermediate nodes which can be secured by QKD.

Unlike a simple chain of nodes which use a different quantum key on each link the method of the present invention allows end-to-end encryption to be applied. Further, it will be clear that as the intermediate nodes in the chain do not actually perform a key agreement step between themselves there is no need for authentication between intermediate nodes. Thus intermediate nodes in the chain do not need to know the identity keys of the adjacent nodes.

Authentication is still required between the first or source node and each intermediate node in the chain, otherwise a man-in-the-middle attacker could pretend to be a node and learn the quantum key established with that node. Knowing one quantum key would allow the attacker to determine the subsequent quantum key. However as each key agreement step involves the first node it can maintain the identities of each intermediate node it agrees a key with. The first node thus does not have to trust the intermediate nodes to authenticate correctly and replacement or maintenance of a node only requires the new identity to be provided to the first node, reducing maintenance overhead.

Obviously there must also be mutual authentication between the first and second nodes, i.e. the source and destination nodes. Again however the method of the present invention allows direct authentication between the two nodes wishing to communicate.

It will be apparent that as the first node performs the QKD key agreement step with each node in turn, part of the key agreement and authentication process can involve using some of the shared secret values established in those steps to update the identity key of each node. This applies to each intermediate node and the destination node. The present invention therefore allows identity keys known to the first node to be updated through QKD, which is not possible using the methods described in the prior art. The method of the present invention therefore offers security advantages in authentication and update in authentication keys as compared with the prior art.

The optical network of the present invention may be any type of known optical network allowing exchange of suitable quantum signals. The network may be comprised by an arrangement of free space transmitters and receivers forming a free space network but conveniently comprise waveguide links between the nodes, for instance fibre optic. The optical network may be implemented purely for QKD purposes, i.e. the optical network may be a backbone carrying QKD signals only, to establish quantum keys between nodes that can then be used to encrypt conventional communications between the nodes sent via some other medium, for instance via another network—a wired electrical, wireless or separate optical network for example. Conveniently however the optical network over which QKD is applied is also adapted for conventional optical communications.

When the same optical network is used for the conventional and quantum signals the quantum signals sent over the optical links are preferably transmitted at a different wavelength to any of the conventional signals. This means that the conventional signals can be transmitted at the same time without swamping the low intensity quantum signal. The quantum signal can be combined into and separated from the optical links by wavelength division multiplexers. There are also three types of conventional communication that may be transmitted over an optical link. The first is the encrypted communication between the first node and the node previous to the targeted node regarding the quantum signal transmitted or received. The second type of conventional communication is the classical discussion between the first node and the targeted node as part of the key agreement step—which may be unencrypted. The third type of conventional communication is the actual data traffic over the network which may be encrypted using an established quantum key. The different types of conventional communication could all operate at the same wavelength when sent in the same direction and use time division multiplexing as appropriate. The skilled person will appreciate that in some optical networks communications sent in one direction are transmitted at a different wavelength to those going the other way to avoid interference. Alternatively some or all the conventional communications may occur at different wavelengths in the same direction so as to avoid confusion and allow separation by WDM.

The network may comprise the same type of link between each node, for instance fibre optic cable—however some links may comprises different media. For instance fibre optic cable could be used on some links with another type of waveguide, such as hollow waveguides in a substrate being used for other link. Some links could be free space whilst others are fibre and/or other waveguide material.

For convenience and practicality the same type of QKD signal may be exchanged between each node in the network path. In this case the step of agreeing a quantum key between the first node and the targeted node involves the same protocol for any targeted node. In other words each quantum signal exchange could, for instance, involve an exchange of single photons suitably modulated according to a particular QKD protocol and the subsequent key agreement step involving the first node and targeted node would follow the relevant part of said protocol. However the method could be operated with different quantum signals being exchanged between particular nodes as appropriate. For instance the protocol could be a BB84 type protocol but the quantum exchange across one link could be of single photons modulated in polarisation whereas the quantum exchange on the next link could be modulated in phase. The principle of the key agreement step is the same so provided the correct type of quantum transmitters and receivers are used the method would work appropriately. Alternatively a two state polarisation modulation could be applied on one link and used in agreement of the key whereas a six state polarisation may be used on the next link, again with appropriate arrangement of different types of quantum transmitter and receiver. The first node in such an arrangement would obviously need to know the type of quantum signal exchanged and be able to follow the appropriate protocol but having used the relevant protocol to establish a quantum key with a particular quantum node that protocol need not be used again if not appropriate. The use of a different type of quantum signal on different links might be advantageous if some links are different to others, for instance if some links are free space whereas other links are fibre based. The method is therefore adaptable to a variety of different quantum transmitters and receivers being arranged across the network.

As described above each quantum exchange step between a quantum transmitter and receiver may be performed using known QKD techniques. Thus known techniques improving the efficiency or security of the exchange, use of decoy states and the like for instance, may be used as appropriate. Provided all necessary details of the quantum signal exchanged are provided to the first node it can agreed the key and apply any additional security enhancements as if it has sent or received the quantum signal itself.

The network may involve active switches for dynamically forming at least one network path through the network, i.e. an active switch receiving optical communication data from one node via an optical link can choose the correct link or links to which to pass the data so that it reaches its destination. Such switches may be electrical in operation. That is an optical data signal received at the switch may be converted from the optical domain to the electrical domain for processing and correct routing, and then retransmitted on the correct link in the optical domain. Such a switch may therefore have at least one input link and at least two output links. Conveniently though the active switch may be able to receive optical communications from each link and retransmit them on any other link. Clearly the quantum signal can not successfully traverse the active switch and hence such a switch will comprise a network node and have at least one QKD apparatus for sending or receiving quantum signals on each optical link to the switch.

The method of the present invention operates in the same manner as described above via a node containing an active switch. For instance consider a source node is connected to an intermediate node which comprises an active switch. The active switch is further linked to two further nodes, a first endpoint and a second endpoint, of which the second endpoint is the destination node. In use the source node establishes a first quantum key with the intermediate node as described above. It also tells the intermediate node that the second endpoint is the destination node (which may be done in an initial path reservation step prior to commencing the QKD phase). The intermediate node therefore exchanges a quantum signal with the second endpoint and communicates with the source node using this first quantum key as described above so that the source node has all the information it needs to then undertake the key agreement step with the second endpoint. The source node therefore authenticates with the second endpoint and agrees a second quantum key. This second quantum key is then used to encrypt a conventional optical communication sent to the second endpoint via the active switch of the intermediate node. In this way a secure key for end-to-end encryption is established.

The method of the present invention is also robust against malfunction of the switching or routing equipment. Consider the situation if, having established the first quantum key with the intermediate node correctly, the intermediate node then makes an error in selecting the correct destination node, i.e. it exchanges a quantum signal with the first endpoint rather than the second endpoint. In known QKD schemes this error may not be detected. In the present invention however the source node communicates with the intermediate node and then attempts to agree a key with the endpoint involved in the quantum exchange with the intermediate node. The source node expects this endpoint to be the second endpoint, i.e. the intended destination, and therefore will be conducting authentication based on the identity key of the second endpoint. In fact however the endpoint that was involved in the quantum exchange was the first endpoint, which has a different identity key. Thus the authentication stage will fail, the error will be spotted and no second quantum key will be established.

Another possibility for error is that the first quantum key is established correctly between the source node and intermediate node and the second quantum key is established correctly between the source node and the second endpoint but subsequently the active switch fails to route the subsequent communication correctly. In this scenario the first endpoint may receive the communication sent by the source node. However it will be noted that this communication is secured by the second quantum key. The first endpoint is unaware of the second quantum key and therefore, even if the communication is sent to it by mistake, it remains unintelligible.

The present invention therefore avoids trusting the routing or quantum exchange of any intermediate nodes.

The network may also comprise at least one passive optical switch. As the skilled person will be aware a passive optical switch, in the simplest form, acts as a 1:N channel splitter/recombiner. A passive optical switch therefore connects one node, which may be referred to as an upstream node, to a plurality of other nodes which may be referred to as downstream nodes. The connection comprises a shared link from the upstream node to the passive optical switch and then an individual link from the switch to each downstream node—unless any downstream link comprises a further passive optical switch. Any optical communication from the upstream node sent via the passive optical switch will be split evenly between all the links to the downstream nodes. Thus the single upstream node can broadcast to all downstream nodes simultaneously and all downstream nodes receive the same optical signal. Communications from any downstream node sent to the passive optical switch will always be directed to the upstream node. The downstream nodes therefore can not communicate directly to one another via the passive optical switch. The downstream nodes therefore time division multiplex their communications with the upstream node to avoid interference on the shared link.

Where the upstream node intends to communicate with one particular downstream node only it can label the data intended for that node and time division multiplex said data with data for any other downstream node and send all the data to all the downstream nodes who can then read the data meant for them.

Use of a passive optical switch does therefore mean that data sent by the upstream node to a downstream node will be received by all other downstream nodes. This may be acceptable in some situations and a simple label may tell the other downstream nodes to ignore data not meant for them. For security however any data intended for a single downstream node is preferably encrypted using a key known only to that node and the sender.

In a passive optical switch the signal remains in the optical domain for passage through the switch. It is known that quantum signals, such as single photons, can be transmitted via a passive optical switch. British Telecom U.S. Pat. No. 5,768,378 teaches that QKD may also be used to distribute keys between a single sender (Alice) and multiple receivers (Bobs) via a passive optical network. Light sent downstream from the Alice end encounters one or more passive optical network switches which distribute the light between their outputs. In terms of sending single photons for QKD each photon traverses one of the downstream paths at random and ends up at one particular Bob. Each Bob therefore receives a different series of single photons and each Bob can then undertake a key agreement step with Alice to establish a quantum key unique to that Bob.

A passive optical switch need not comprise a node of the network therefore but can be used to link a plurality of downstream nodes to an upstream node via a common link from the passive optical switch.

For example a source node may be connected to an intermediate node. This intermediate node may then be connected to a passive optical switch such that the intermediate node is the upstream node, the passive optical switch being connected to two downstream nodes, first and second endpoints. Assume that again the source node wishes to communicate with the second endpoint and not the first endpoint. In the first iteration of the present method the source node agrees a first quantum key with the intermediate node. This intermediate node then undergoes a quantum exchange with the second endpoint. Note that if the intermediate node transmits photons as part of the quantum exchange with the second endpoint each of those photons will be randomly directed to either the first or second endpoint. The fact that the first endpoint receives photons in addition to the second endpoint is immaterial to the operation of the method as each endpoint receives different photons. If the second endpoint transmits photons as part of the quantum exchange then these will all be received by the intermediate node, subject to losses in the system.

The source node, having communicated with the intermediate node about the quantum exchange using the first quantum key, can then discuss the quantum signal with the second endpoint to agree a quantum key. Note that both endpoints may have received a quantum signal if the intermediate node is the quantum transmitter and so both endpoints may be able to agree a quantum key with the source node. However as described above the source node will only complete an authenticated key agreement with the endpoint which has the correct identity key—in this case the second endpoint. Having thus agreed the second quantum key with the second endpoint the source node can then send communication data encrypted using the second quantum key. The intermediate node will relay this data and the passive switch will pass the data down each downstream channel such that both endpoints receive the data. However only the second endpoint will have the second quantum key and so will be able to successfully decrypt the message.

Of course whilst the network need not have a node co-located with a passive optical switch there may be instances where it is advantageous to have a node co-located with a passive optical switch. For instance where a passive optical switch is used having 1:N branching where N is a large number it may be beneficial not to pass the quantum signal downstream through the passive optical switch. As each single photon is sent down a different downstream link at random in general each node will only receive 1/N of the photons sent from the upstream node and these will be received, on average, at 1/N of the rate of transmission. For a large value of N, i.e. a large number of branches, the amount of photons received at each downstream node or rate of arrival, may become too low. Thus it may be preferred to locate a quantum signal transmitter and/or receiver at the passive optical switch on the link to the upstream node with a separate quantum transmitter and/or receiver on each downstream link to a downstream node.

The skilled person will of course realise that M:N way splitters/recombiners could be used in an optical network in signals on any of M upstream inputs are passed equally to each of the N downstream outputs and in reverse any signal received from one of the N downstream inputs is passed to each of the M upstream outputs. The principles of the present invention are the same for such splitters/recombiners.

The network may of course comprise any number of active and/or passive switches arranged in various combinations.

The network may also comprise other devices such as signal boosters or relays which may simply detect and retransmit the optical communication signal. Such devices may therefore interfere with a quantum signal and hence comprise a node in the network.

Further the network may comprise at least one node located for effective QKD. As the skilled person will be aware whilst current QKD systems can cover long distances there are still distance limitations and, in general, a correlation between distance traveled by the quantum signal and losses. Given the present invention does not suffer security disadvantages by having intermediate nodes the network may comprise nodes positioned to reduce QKD losses without having any effect on the conventional communication signals.

As mentioned above the identity key of any node is preferably updated as part of the key agreement step with the first node. The updated key is known to both nodes taking part in the key agreement and hence can be used next time those nodes want to communicate. It will be apparent however that there may be many endpoints connected to the network and any endpoint may wish to communicate to any other endpoint via the same intermediate nodes. Each node therefore may need to maintain a separate identity key for each other node with which it agrees (or may in the future want to agree) a quantum key. This may be necessary not only so that legitimate endpoints can not be used to impersonate one another but also because as a particular endpoint agrees a quantum key with an intermediate node, the identity key for both nodes is preferably updated—however if the identity key of the intermediate node is common to all endpoints it could not be updated without somehow involving all endpoints.

As mentioned above the quantum key established between a source node and a destination node may be used for end-to-end encryption of communications between them. The communication could be any data they wish to exchange and may comprise data to be used as a cryptographic key, for instance a traffic key. This traffic key may then be used to encrypt end-to-end communications across the network. The source node may, for example, establish a separate quantum key with each of several different endpoints distributed throughout the network using the method of the present invention. The source node can thus communicate with each endpoint using the appropriate quantum key for secure end-to-end encrypted communication. However one of these endpoints can not communicate securely with another of these endpoints without agreeing a separate quantum key with that endpoint or sending a message via the source node—which may not be efficient. In one embodiment however the source node uses the individual quantum key agreed with each endpoint to transport to that endpoint a traffic key, the same traffic key being sent to each endpoint. Each endpoint thus receives the same traffic key which can be used for direct end-to-end encryption between any of the endpoints without needing to send message via the source node.

The method may therefore involve one or more nodes in the network acting as key managers or key transmitters. The key manager nodes may operate automatically or on request to provide the same key to different nodes for communications across the network. For example, suppose one node in the network is a key manager. Any node, a requesting node, wishing to establish communications between it and one or more destination nodes, contacts the key manager to request a traffic key. The key manager node then acts as the first node in the method of the present invention and sequentially agrees a quantum key with each intermediate node until it establishes a quantum key with the requesting node. It also does the same for each destination node. Each of the requesting node and the destination node(s) are then sent the same traffic key by the key manager, in each case using the appropriate quantum key. The traffic key, once received can be used for communication between the requesting node and the destination nodes.

If all communications over the network were encrypted using keys provided by such a key manager then only that key manager would ever need to agree a quantum key with another node in the network. Hence each other node, i.e. not the key manager, whether an intermediate node or an endpoint would only need to maintain one identity key which would be shared with the key manager and updated with the key manager as necessary. The key manager would of course need to maintain an identity key for each other node in the network but the key manager node could be a specialised node. This arrangement does therefore reduce the amount of identity keys needed for each non-key manager node. Even if there were more than one key manager, for instance for efficiency or redundancy reasons, limiting the number of key managers and ensuring the method of the present invention is only applied with a key manager node as the first node of the method therefore effectively limits the number of identity keys needed by a non-key manager node.

It will be apparent however that implementing the method using one or more key managers in this way does rely on trusting the key manager. A requesting node wishing to establish communications with a destination node relies on the key manager correctly identifying the destination and authenticating appropriately. Thus use of a key manager may not be appropriate for all applications.

The present invention can be used for the transport of traffic keys to provide a community of users on the network, for instance one community may comprise the IT equipment, workstations, servers, databases etc. of a particular organisation. Use of encryption in this way effectively means that communications over the network are only intelligible to users within the same community. Thus each community effectively has a separate secure network even though the network infrastructure is shared. Whilst different communities may be different organisations, communities may be implemented within the same organisation. For instance a first community may be arranged to implement a first effective network for general business communications and a second community arranged to implement a second effective network for more sensitive business communications.

Where there are different communities of users on the network each community may have its own key manager to improve security. For instance imagine a network comprises a plurality of endpoints belonging to a first community and also a plurality of endpoints belonging to a second community, each endpoint being only in one or the other community but all connected to the network via common intermediate nodes (the intermediate nodes purely being switches, relays or the like). A first key manager node may be provided for the first community and a second key manager node for the second community. On initialisation the first key manager node would be provided with an identity key for each and every intermediate node in the network (although if some intermediate nodes were irrelevant for any network path to any endpoint in the first community, i.e. they would never need to agree a quantum key with the first key manager, there would be no need for the first key manager to know their identity) and likewise each intermediate node would be provided with a corresponding identify key for the first key manager. The first key manager would also be arranged to share an identity key with each endpoint in the first community. However it would not be provided with the identity key of any endpoints in the second community. Nor would any endpoint in the second community be provided with an identity key for the first key manager. The second key manager would likewise be arranged to have an identity key for each and every intermediate node it will need to communicate with to agree a quantum key. Each intermediate node would also be provided with the relevant identity key for the second key manager node. Thus each intermediate node has a separate identity key for each of the first and second key mangers. Finally the second key manager would share an identity key with each endpoint in the second community.

In operation any endpoint in the first community could contact the first community key manager to request a traffic key for communication between it and any other endpoint in the first community. The first key manager would then apply the method of the present invention and establish a quantum key with the relevant endpoints, via the relevant intermediate nodes. As a quantum key is agreed with each intermediate node the relevant identity key for the first key manager is used and update—leaving the identity key for the second key manager unchanged. The quantum keys established with the relevant endpoints can then be used to distribute a traffic key for encrypting communications between those endpoints.

Were an endpoint in the first community to contact the second key manager by mistake, the second key manager may try to establish a quantum key with that endpoint but the effort would fail because of the lack of a shared identity key. Further were the first key manager to get the wrong destination node and attempt to agree a key with an endpoint in the second community such an attempt would also fail because of a lack of authentication—although it is acknowledged that if the key manager were to attempt to agree a quantum key with an incorrect endpoint in the first community it may be successful and transport the transport key to the wrong endpoint. Hence although messages could potentially be incorrectly delivered within the same community the arrangement provides security against delivery outside the community being intelligible.

It should be noted that the two communities could communicate if one endpoint in the first community acted as a gateway and had a communication link to another network or to an endpoint in the second community which acts as a gateway. Additional controls and safeguards may be applied to traffic passing through the gateway which is not applied to intra-community traffic.

Although described in terms of a node in the first community requesting a traffic key the key manager could be arranged to automatically distribute traffic keys to endpoints in the relevant community in a predetermined fashion.

As described above the method of the present invention involves a quantum exchange between each adjacent node in the network path between a first node and a second, destination node. Each intermediate node in the path therefore must be able to exchange a quantum signal over the link to the previous node and separately over the link to the subsequent node. To provide most flexibility therefore each intermediate node may preferably be arranged to exchange a quantum signal over each link which links it to another node of the network—although depending on network arrangement and whether a limited number of nodes can act as a first node of the method this full flexibility may not be required. Any node which is an endpoint must of course be able to exchange a quantum signal over the link it has to its adjacent node.

Each node therefore comprises at least one quantum signal transmitter and/or at least one quantum signal receiver. In standard point-to-point QKD systems the quantum exchange is one way, i.e. one endpoint has a quantum signal transmitter and the other endpoint has a quantum signal receiver, and the present invention may apply one way quantum exchange across any given link between nodes.

It is possible however to perform two way quantum exchange across a single link, for instance to increase data rates, and therefore each endpoint may have a quantum signal transmitter and a quantum signal receiver arranged to operate over the same link.

It may also be convenient to arrange each node to be capable of both transmitting and receiving a quantum signal on each link at separate times. Such an arrangement may ease arrangement of nodes into a network and allows nodes to be added, removed or relocated more easily.

If one way quantum exchange is applied, the network is arranged such that, for each link between nodes over which a quantum signal will need to be exchanged one node comprises a quantum transmitter and the other a quantum receiver. The exact arrangement of transmitters and receivers across the various nodes is not important provided each individual link between two nodes comprises a quantum receiver in one node for receiving the quantum signal transmitted over the link by a quantum transmitter in the other node.

Consider the operation of the method for QKD between the first node and a second node via a single intermediate node. In operation the first iteration of the method involves a quantum exchange between the first node and the intermediate node. If the first node comprises a quantum transmitter for that link it therefore transmits the quantum signal which a quantum receiver at the intermediate node receives. Alternatively if the first node comprises a quantum receiver it may communicate with the intermediate node, if necessary, so that the intermediate node transmits a quantum signal over the link which the first node attempts to receive (in some embodiments the quantum transmitter of the intermediate node may be arranged to transmit continually or automatically at regular intervals). In either case the first node and intermediate node then agree a first quantum key as normal.

In the next iteration the intermediate node exchanges a quantum signal with the second node. The intermediate node may have a quantum transmitter arranged on the link to the second node and hence the exchange of the quantum signal may involve transmission of a suitable quantum signal to the second node where a quantum receiver is arranged to receive the signal. After transmission the intermediate node may then communicate to the first node information regarding the quantum signal transmitted, for example if a BB84 type protocol is used the intermediate node would communicate to the first node information regarding the encoding base and data value applied to each photon. Given the encoding base and data value is generally based on a random number generated by a random number generator the communication could simply comprise the random numbers used.

Alternatively the intermediate node may have a quantum receiver arranged on the link with the second node, with the second node having a quantum transmitter on this link. In which case the quantum exchange involves the second node transmitting the quantum signal to the intermediate node. The intermediate node receives the quantum signal and, if using a BB84 type protocol, applies an encoding base to each photon it receives and measures a data value using said base. The intermediate node may therefore communicate to the first node, using the first quantum key, information about the applied encoding base and data value for each photon received. The first node can then undertake the key agreement step with the second node as desired.

Thus it can be seen that whatever the arrangement of quantum transmitter and receiver over the two links the method of the present invention applies.

In the instance where the intermediate node comprises the quantum transmitter however it is possible to perform the method such that the intermediate node does send the first node details about what the quantum signal sent was, but instead the first node tells the intermediate node what the quantum signal transmitted should be before it is sent. For instance, as mentioned above, the modulation applied to the quantum signal may be based on a string of random numbers. The first node may therefore be arranged to generate its own random numbers and communicate them to the intermediate node in the secure communication step. The intermediate node could then use these number as the basis for the modulation applied to the quantum signal. The first node, having generated the numbers, would know what modulation had been applied—thus it could proceed to perform the key agreement step with the second node without further communication from the intermediate node. This arrangement could remove the need for the transmitter at the intermediate node to have its own random number generator which could therefore simplify the components of the intermediate node. It could also avoids the first node from having to trust the randomness of the intermediate nodes random number generator.

The step of performing a quantum exchange between a targeted node and the previous node may therefore involve the previous node transmitting a quantum signal to the targeted node and the step of communicating information regarding the quantum signal between the first node and the node previous to the targeted node may comprise transmitting data from the first node to the node previous to the targeted node about the modulation to be applied to the quantum signal. The information regarding the modulation to be applied may be a string of random numbers.

It will be clear that in order to be able to perform the method in this manner requires the network to be arranged such that any path from a node capable of being a first node to any node capable of being a second node travels via nodes where a quantum transmitter is arranged on the link to the subsequent node in the path. In some instances this may be arranged by careful network arrangement—especially where there are a limited number of nodes arranged to act as first nodes, such as when using key managers to establish quantum keys and then distribute traffic keys as described above. One should also remember that once a quantum key has been established between the first and second nodes the second node may be the first to use it for communications and hence a node, not arranged to act as a first node but capable of acting as a second node, wishing to initiate communication with a first node may instruct the relevant first node to set up the quantum key.

As an alternative at least some nodes may comprise a quantum transmitter and a quantum receiver arranged on the same link so as to be able to transmit or receive a quantum signal over that link. Quantum signals transmitted one way over a particular link may be transmitted at a different wavelength to quantum signals transmitted in the other direction of the link to allow appropriate combination and separation of the signals transmitted and received by wavelength division. Alternatively an optical switch such a moveable mirror could be used to select the quantum transmitter or receiver as appropriate.

In general though the method of the present invention operates with any arrangement of transmitter and receivers over the various links provided that on any one link there is a transmitter in one node and a receiver in the other.

When the first node is communication with a node which is transmitting a quantum signal, whether the first node tells the transmitting node what to transmit or whether the transmitting node tells the first node what was sent, it is possible to reduce the amount of data transmitted through use of pseudorandom number generators. Pseudo-random number generators are well known and use predetermined algorithms to act on a seed string of bits to produce a longer string of bits which has the properties of a random number over a certain length. However the same seed always produces the same output. Thus whichever node produces the data for modulation a relatively small string of random numbers may be generated and communicated between the transmitting node and the first node. Both nodes can then use this small random number as the seed in a pseudo-random number generator to produce a longer string, which is known to both nodes and used for modulating the quantum signal.

As mentioned above the method of the present invention means that an intermediate node does not authenticate with another intermediate node nor does it perform a key agreement step with another intermediate node and therefore it does not need to be trusted in those functions. Also as messages are encrypted end-to-end it need not be trusted with correct routing. However the data received and/or sent by the node regarding the quantum signal and any data about identity keys needs to be safeguarded to ensure security of the communications. Thus each node should preferably be physically secured so that it not accessible to unauthorised personnel and designed or screened to prevent emissions which could reveal the key data. Preferably the QKD apparatus of each node is physically secure, for instance located in a tamper proof and/or screened environment and/or provided with various tamper detection devices such as will be known to one skilled in the art.

The method of the present invention is therefore applicable to QKD across any optical network environment provided that a quantum signal exchange can be performed between adjacent nodes in the network. The ability to perform end to end quantum key agreement is an aspect of the present invention. Thus in another aspect of the invention there is provided a method of quantum key distribution across a network comprising a plurality of nodes the method comprising the step of performing a quantum key agreement step between two nodes which do not have a direct optical link between them. The key agreement step involves the step of discussing a quantum signal exchange.

Figure 2:
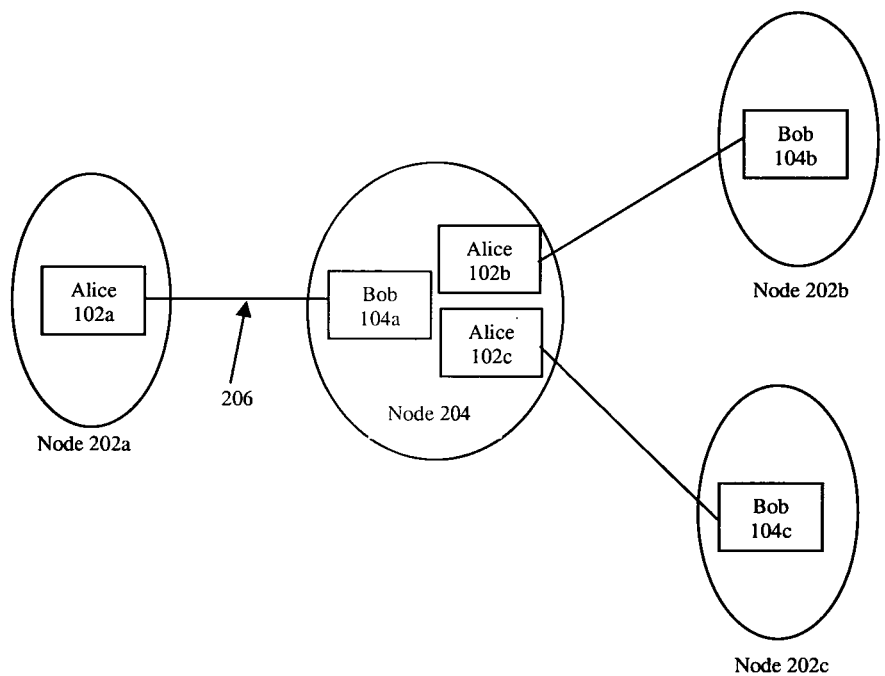
Figure 3:
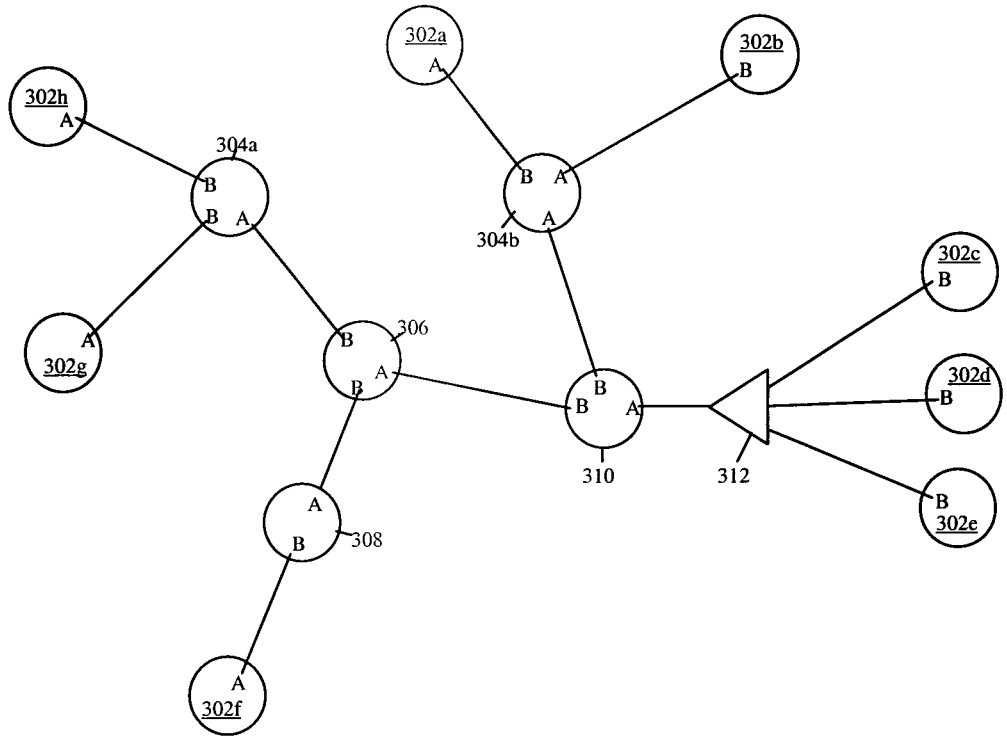
Figure 4:
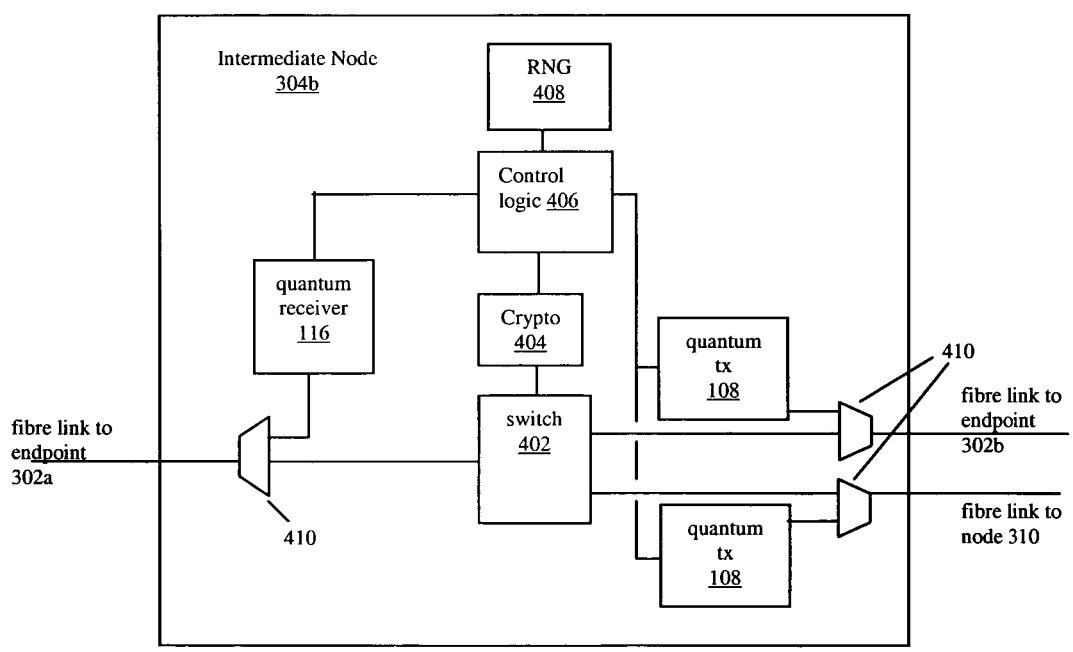
Figure 5:
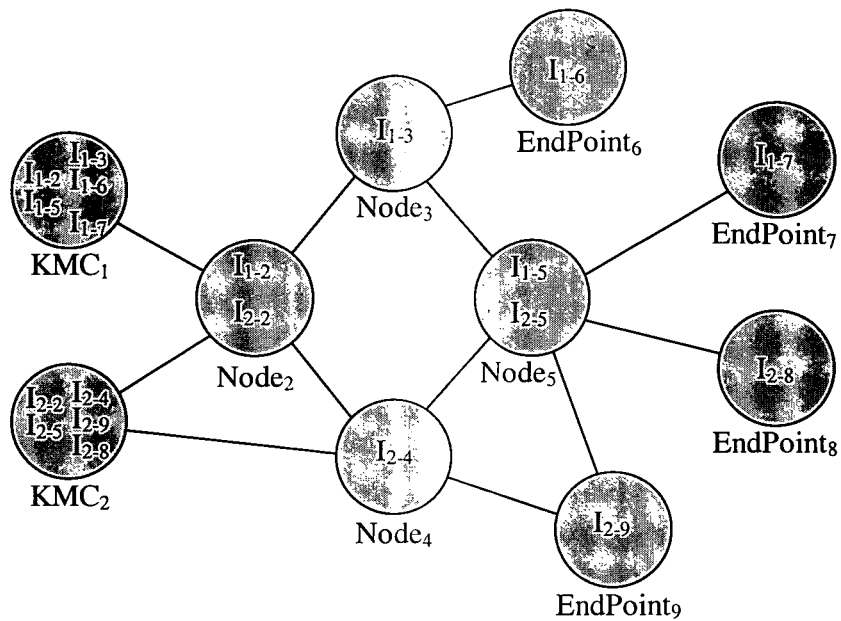
Figure 6:
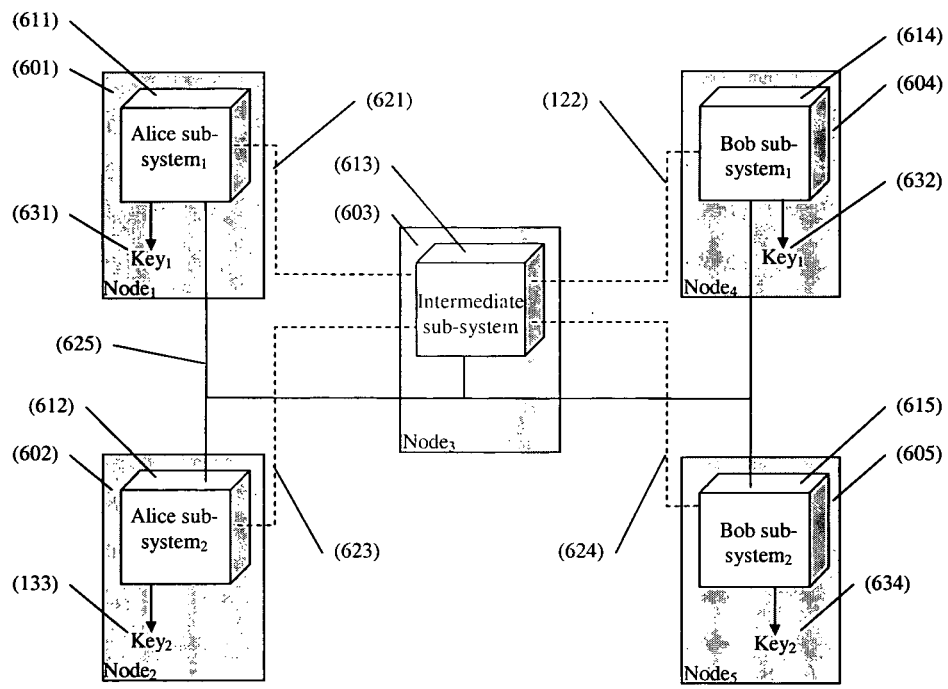
Figure 7:
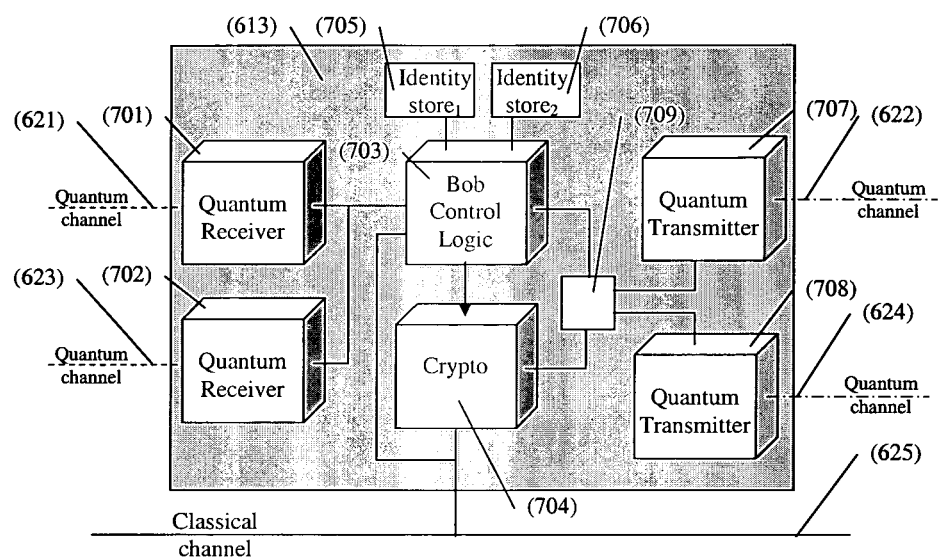

The invention will now be described by way of example only with reference to the following drawings of which:

FIG. 1 shows a schematic of a standard QKD transmitter (Alice) and receiver (Bob) arranged over a single optical link, FIG. 2 illustrates the present invention applied to a simple network, FIG. 3 shows a more general network arrangement, FIG. 4 shows a schematic of one of the intermediate nodes shown in FIG. 4, FIG. 5 shows a network arrangement having a limited number of nodes arranged to act as key managers for the network, FIG. 6 shows another embodiment of a simple network arrangement, and FIG. 7 shows a schematic of the intermediate sub-system of FIG. 6.

Referring to FIG. 1 the basic structure of a standard QKD system is shown. The unit 102 comprising the quantum transmitter, typically referred to as Alice, is optically linked to the unit 104 comprising the quantum receiver, typically referred to a Bob. The optical link may be through free space or any suitable waveguide but for illustration will be described herein as being a fibre optic link. A typical Alice unit compromises a random number generator 106, quantum transmitter 108, controlling logic 110 and classical transceiver 112. The quantum transmitter 108 produces a series of single photons, each photon being randomly encoded using a value produced by the random number generator. The skilled person will readily appreciate that there are a number of different known encoding protocols and a number of suitable transmitters which could be used for QKD and hence these aspects will not be described further. For the purposes of this description a BB84 type protocol will be assumed wherein one of two encoding bases is chosen at random for each photon and the photon is randomly encoded with a data value of 1 or 0 in the chosen encoding base. The data regarding the applied encoding base and data value for each photon is passed to the Alice control logic 110.

The series of encoded single photons are transmitted through the fibre optic to the Bob unit 104. A typical Bob unit comprises a quantum receiver 116 which randomly chooses an encoding base with which to measure the photon and then determines a data value for the photon in the chosen base. The output of the quantum receiver 116, which indicates the applied encoding base and measured value for each detected photon is passed to Bob control logic 118.

Alice control logic 110 and Bob control logic 118 then communicate with each other via classical transceivers 112 and 120 respectively to establish a common shared key as is well known. Note as used herein the term logic means any suitable device arrangement for performing the key agreement protocols. The control logic may be a suitably designed ASIC or a suitably programmed FPGA. The control logic could also be a suitably programmed microprocessor.

In establishing a common shared key, Alice control logic 110 and Bob control logic 118 mutually authenticate each other in order to exclude the possibility of a man-in-themiddle attack. Such authentication is a well known procedure and may, for example, involve the two parties applying digital signatures to the messages they exchange. The digital signatures are generated and validated by means of a cryptographic key referred to as the identity key for the link. This may be based on symmetric cryptographic techniques in which case the identity key is a secret value known only to both parties.

Having used QKD to establish a new common shared key value, and mutually authenticated each other, Alice control logic 110 and Bob control logic 118 use that value in part to update the secret identity key and in part as an encryption key for protecting subsequent communication between them.

FIG. 2 shows how the present invention may be implemented in a simple network. The network shown in FIG. 2 consists of three endpoint nodes 202a-c, each linked via a fibre optic link 206 with an intermediate switching node 204. The switching node 204 comprises an active switch (not shown) which can receive optical data on the link from any node and re-transmit that data out to any node.

Node 202a comprises an Alice unit 102a arranged in communication over the fibre link with a Bob unit 104a within the switching node 204. The Alice and Bob units may be the same as described above with reference to FIG. 1. Switching node also comprises Alice units 102b and 102c arranged in communication with Bob unit 104b in node 202b and Bob unit 104c in node 202c respectively.

In use suppose node 202a wishes to communicate with node 202b but wants to keep the communication secret from eavesdroppers and protect against it being delivered to node 202c by mistake. Node 202a therefore establishes a first quantum key with switching node 204 by QKD and authenticates this quantum key with switching node 204 to ensure that it is indeed communicating with the switching node. This authentication is based on an identity key shared by node 202a and node 204.

Node 202a then instructs node 204 to transmit a series of single photons from Alice 102b to node 202b and, once the quantum transmission has occurred to tell node 202a what was sent. The communication between switching node 204 and node 202a is encrypted using the first quantum key to protect it from eavesdropping. Once it is aware of what quantum signal was transmitted node 202a undertakes an open classical communication with node 202b, obviously via the switching node 204, to establish a quantum key as described above. Further node 202a authenticates the key based on an identity key known only to it a node 202b. In this way node 202a has confidence that it is talking to node 202b and does not need to trust switching node 204. Having authenticated the exchange part of the key agreed can be stored for use as a new identity key and the rest can form a second quantum key which can be used for end-to-end encryption.

Had the switching node mistakenly thought that node 202a wanted to talk to node 202c it might have instead transmitted a quantum signal from Alice unit 102c to node 202c and subsequently directed the classical communication of node 202a which is part of the key agreement step to node 202c. In such an event however the authentication step would have failed because node 202c would not have the correct identity key.

The present invention therefore allows an endpoint node to agree and authenticate a direct quantum key with any other endpoint node.

If node 202b wanted to communicate with node 202a and they needed a new key it could simply ask node 202a to repeat the process. However it could establish the key itself by essentially performing the same process in reverse, i.e. it contacts switching node 204 to indicate it wishes to establish a quantum key with node 202. As a first stage Alice unit 102b of the switching node transmits a quantum signal to node 202b which they discuss to agree a quantum key, authenticating as usual. This time it is node 202b authenticating and hence the relevant identity key held by switching node 204 is different. Having established this key, Alice 102a is instructed to transmit a quantum signal to Bob 104a in the switching node. The switching node then sends details of each photon received to node 202b which then takes the place of the switching node in the subsequent key agreement step. Assuming everything is in order nodes 202b and 202a authenticate and agree the new quantum key for subsequent communications.

It is also possible for node 202b to agree a key with node 202c if desired. A first quantum key is established with switching node 204 as described above. Then Alice unit 102c sends a quantum signal to Bob unit 104c in node 202c, the details of which are sent by the switching node to node 202b using the first quantum key. Node 202b then undergoes a key agreement step with node 202c to authenticate and agree a second quantum key.

The method of the present invention scales to more general networks as illustrated in FIG. 3. Here a series of endpoints 302a-g are connected. The endpoints of the communication network may be connected to any suitable communications equipment. For instance if the network is a network for communications between computers the endpoints may be connected to individual workstations, servers, databases and the like.

The endpoints 302a-g are connected by fibre optic links and intermediate nodes 304a, 304b, 306, 308 and 310. Intermediate nodes 304a and 304b are both connected to endpoints and to other intermediate nodes and may comprise an active switch for routing data traffic appropriately. Intermediate node 306 is connected to other intermediate nodes only but in all respects could be essentially identical to nodes 304a and 304b and again could comprise an active switch for routing data traffic.

Intermediate node 308 only links to two nodes and therefore does not necessarily require any switching capability. This intermediate node could correspond to the location of an optical signal booster or relay in the network where the optical transmission is interrupted. Hence a node is required because of the interruption of the quantum signal. Alternatively the node may be positioned purely to reduce the distance the quantum signal needs to travel between nodes, for instance if endpoint 302f were located a very long way from intermediate node 306 there could be problems in transmitting a quantum signal efficiently over the intervening distance. As the present invention does not reduce security in providing additional nodes, intermediate node 308 may be located on this optical link to provide two separate quantum links which can function efficiently.

Endpoint nodes 302c-e are all connected to intermediate node 310 by passive optical switch 312. That is there is a single fibre link between intermediate node 310 and the passive optical switch 312 but each endpoint 302c-e has its own separate link to the passive optical switch 312. Any optical data traffic sent from intermediate node 310 is split by passive optical switch 312 and passed to each of the endpoints 302c-e. Optical data from any of the endpoints 302c-e travels through the passive optical switch 312 to intermediate node 310 as is well understood by those skilled in the art.

Each node has either an Alice unit A or a Bob unit B arranged on each optical link, each optical link having an Alice at one end and a Bob at the other. In this arrangement any endpoint can talk to any other endpoint and can establish a direct quantum key with that endpoint.

For example imagine endpoint 302a wishes to talk with endpoint 302f. Endpoint 302a may first establish a network path through the network. In this case there is only one sensible path, endpoint 302a—intermediate node 304b—intermediate node 310—intermediate node 306—intermediate node 308—endpoint 302f. In some networks however there may be multiple possible routes and the route chosen may depend on network loading on particular nodes.

Once the route is established endpoint 302a establishes a quantum key with each node in the path in turn as described above, that is the Alice of endpoint 302a transmits a quantum signal to the Bob of intermediate node 304b and they then discuss to establish a first quantum key. Intermediate node 304b then transmits photons to the Bob at intermediate node 310 and sends details of what was sent to endpoint 302a. Endpoint 302a then discusses with intermediate node 310 and they agree a second quantum key. Intermediate node 306 then transmits a quantum signal to intermediate node 310 and intermediate node 310 transmits details of the detected photons to endpoint 302a using the second quantum key. Endpoint 302a then proceeds to agree a third quantum key with intermediate node 306.

This process is repeated for each node in turn until, in the last stage endpoint 302f transmits a quantum signal to intermediate node 308 which receives the signal and sends details about the detected photons to endpoint 302a using what would be the fourth quantum key. Endpoints 302a and 302 can then agree a fifth quantum key which can then subsequently be used for encrypting communications between them.

The process would be essentially the same, just proceeding via a different route, were the endpoint 302a want to communicate with endpoint 302h.

If the endpoint wants to communicate with endpoint 302d the process is also essentially the same. Endpoint 302a would establish a separate quantum key in turn with each node up to intermediate node 310. Intermediate node 310 would then transmit photons from its Alice unit to endpoint 302d via the passive optical switch 312. The passive optical switch would randomly direct each photon to one of the three endpoints 302c, 302d and 302e. The Bob within endpoint 302d would therefore receive approximately one third of the photons transmitted by the Alice of intermediate node 310.

Intermediate node 310 would then send to endpoint 302a using the relevant quantum key details of all photons transmitted (as it doesn't know which transmitted photons were received by any particular endpoint). Endpoint 302a then discusses with endpoint 302d which photons it did receive and the encoding bases to establish a shared secret value as in normal QKD. As the key agreement step involves authentication endpoint 302a can be certain it is talking to endpoint 302d otherwise it would refuse to establish or use a quantum key. It will of course be noted that as endpoints 302c and 302e receive all conventional optical communications sent to endpoint 302d via the passive optical switch, they will receive all classical message sent by endpoint 302a as part of the key agreement stage. However as they received different photons to endpoint 302d this does not allow them to determine the quantum key agreed by endpoints 302a and 302d. The quantum key, once agreed, can be used to encrypt communications between endpoint 302a and endpoint 302d and even though all communications sent to endpoint 302d will also be received by the other endpoints connected to the passive optical switch only endpoint 302d has the correct key to decrypt the messages.

The skilled person will appreciate that the network is shown with an Alice unit in the intermediate node 310 transmitting to Bob units in each of the endpoints 302c-e. This arrangement could be easily reversed however with an Alice in each of these endpoints transmitting to a Bob in the intermediate node 310. The passive optical switch would pass any quantum signal transmitted by an endpoint 302c-e to the Bob at intermediate node 310 and hence a quantum exchange can occur as normal—all that is required is time division multiplexing between the endpoints transmitting upstream through the passive optical switch.

Any of endpoints 302c-e could also initiate the method of the present invention and would simply start by getting intermediate node 310 to send a quantum signal, part of which would be received by the initiating endpoint and used to set up the key for the first link.

It will of course be noted that although endpoints 302c-e are all connected to the passive optical switch this does not comprise a network node and hence each of the endpoint 302c-e is only connected to intermediate node 310. Thus if two of these endpoints wish to communicate they must do so through intermediate node 310.

Whilst nodes are shown in FIGS. 2 and 3 as having individual Bob and Alice units in reality some of the components could be shared together. FIG. 4 shows an example of how some components might be arranged. FIG. 4 shows an example structure of intermediate node 304b.

The node has three fibre links, all of which are connected to active electrical switch 402. The switch receives optical communications on one channel and, from the address information contained within the communication, picks the appropriate outputs and retransmits an identical optical signal.

Wavelength division multiplexers/demultiplexers are also arranged on each fibre to separate the quantum signal from the optical channel before the switch or add the quantum signal to the optical channel after the switch.

The node is arranged to act as a receiver for quantum signals transmitted from endpoint 302a and hence has a quantum receiver, which may be the same as described above in relation to FIG. 1 arranged to receive the quantum signal. The quantum receiver is connected to control logic 406, to which it passes information regarding photons detected. As part of the key agreement step with any endpoint this node needs to be able to perform a classical discussion with that endpoint. Whilst the control logic could have its own conventional transceiver arranged for this communication in this embodiment it instead is connected to the switch 402 so it can in effect make use of the switches own transceiver. Thus the classical discussion as part of the key exchange occurs at the same wavelength as the data traffic over the network and must be time divisioned appropriately. An endpoint in discussion with this node sends data to the switch as normal but effectively addresses it for the control logic of the node.

The control logic is connected to the switch through a crypto-unit 404 such that, having established a quantum key with any end point the node can then load the crypto-unit with the quantum key for communications with the node about the quantum signal exchanged with the next node in the sequence. As the skilled person will understand a crypto-unit (or crypto) is a device for encrypting or decrypting communications. The crypto-unit may be implemented in ASIC or FPGA form and arranged to use the key in the AES encryption standard for example. Suitable FPGA or ASIC implementations of AES can be obtained, for example from Helion Technology Limited of Cambridge, England The control logic is also connected to random number generator 408 and quantum transmitters 108 arranged to transmit on the links to endpoint 302b and intermediate node 310 via WDMs 410.

The control logic is therefore capable of controlling each of the quantum receiver and quantum transmitters and carry out a key agreement step with any endpoint. Having established that quantum key it can control the transmitter or receiver on the appropriate link and transmit or receive a quantum signal as necessary. It can then use the quantum key in the crypto unit and transmit data regarding the quantum exchange to the appropriate endpoint.

Note that one issue with such an arrangement is that the intermediate node has two quantum transmitters. The random numbers to be transmitted are generated by the random number generator—or in some embodiments are received in an encrypted message which would also identify the onward connection to be used for the transmission. The electronics that sends the random numbers to the quantum transmitter need not be trusted to select the correct quantum channel, but must not send the random numbers to more than one quantum channel otherwise an eavesdropper could observe one channel and learn significant information about the random numbers without disrupting the other channel.

While electronic circuits could be used to prevent the random numbers being duplicated in this way, for example by using triple modular redundancy to stop multiple transmissions, a more easily trusted technique is to use a single transmitter with a passive optical splitter. In this arrangement the electronics is much simpler as it only has to drive one transmitter. The optical splitter will randomly split the quantum signal between all the outputs, but according to the laws of quantum physics cannot produce faithful copies of the single photons making up the quantum signal. The effect of the optical splitter is to reduce the amount of signal reaching the desired quantum receiver, which reduces the rate at which keys can be established but does not prevent it.

In the network implementation described with reference to FIG. 3 any of the endpoints 302a-h can initiate the process of agreeing a quantum key with any other endpoint. Thus each endpoint, and also each intermediate node, must be capable of authenticating separately with each endpoint. This requires every node to maintain eight separate identity keys. One way of reducing the number of identity keys is to limit the number of nodes which can act as the source node in agreeing quantum keys.

FIG. 5 illustrates an embodiment in which limits the number of identities that need to be maintained by each node. In this case a number of Key Management Centres are responsible for generating keys for groups of end-points and must be able to distribute these group keys to the end-points securely. The KMCs can use the network QKD solution described here to set up secure authenticated channels to the end-points in their group and then use these channels to distribute the group key. The QKD network nodes then only need to handle an identity for each KMC, not for each end point.

The example shown in FIG. 5 has two Key Management Centres, $KMC_1$ and $KMC_2$. These manage keys for two groups of end points, group one comprising $EndPoint_6$ and $EndPoint_7$ and group two comprising $EndPoint_8$ and $EndPoint_9$.

Each KMC uses network QKD to establish end point keys with the end points in its group. It then generates a group key and passes this to the end points using the end point encryption key to protect the group key. Where paths from different KMCs to their end points pass through a network node, that node must have an identity for each KMC. In the example, $Node_2$ and $Node_5$ are in this position. Both KMCs use them to reach their end points and so the nodes need to maintain a separate identity with each.

Nodes that only appear on paths from one KMC need only maintain one identity. $Node_3$ and $Node_4$ are examples of this in FIG. 5. The KMCs need to maintain the identity of all their end points and any network nodes that are used to reach them.

Once each endpoint in a group has been provided with the relevant group key that group key can be used to encrypt communications between them.

In this embodiment it is possible to arrange the network such that a link between an earlier node and a later node, in the path from a KMC to an endpoint, always has a quantum transmitter in the earlier node arranged to transmit to the later node. So KMC1 say will have a quantum transmitter arranged on the link to node 2. Node 2 will have quantum transmitters arranged on the links to nodes 3 and 4. Node 3 and 4 will have quantum transmitters arranged on the link to endpoint 6 and endpoint 9 respectively and both will also have a quantum transmitter on the link to node 5. Finally node 5 will have quantum transmitters on each of the links to endpoint 7 and endpoint 8.

This arrangement allows the KMC to tell nodes in the path what quantum signal should be transmitted in the quantum exchange step. In other words KMC1 will transmit a quantum signal to node 2 and establish a quantum key with node 2 as in conventional QKD. It will then use this key to transport some random numbers to node 2 which are used to modulate the quantum signal to the next node in the path, say node 3. KMC1 subsequently agrees a quantum key with node 3 and uses this key tell transport some random numbers to node 3 to use for modulation of the quantum signal transmitted to the next node.

FIG. 6 shows a simple case of such a network wherein two sending nodes, node 1 and node 2, may each establish a quantum key with either of two receiving nodes, node 3 and node 4, the nodes being connected by an intermediate node.

$Node_1$ 601 is equipped with Alice sub-system, 611, $Node_2$ 602 is equipped with Alice sub-system$_2$ 612, $Node_3$ 603 is equipped with an intermediate sub-system 613, $Node_4$ is equipped with Bob sub-system, 614 and $Node_5$ is equipped with Bob sub-system$_2$ 615.

$Node_1$ is connected to $Node_3$ by a quantum channel 621. $Node_3$ is connected to $Node_4$ by a quantum channel 622. $Node_2$ is connected to $Node_3$ by a quantum channel 623. $Node_3$ is connected to $Node_5$ by a quantum channel 624.

All five nodes are connected to a common classical channel 625 which carries messages between the various sub-systems to discuss the outcome of the transmission on the quantum channels, in accordance with the well known principles of quantum key distribution.

Alice sub-system, 611 uses QKD to establish a key with the intermediate sub-system 613. This process involves sending random numbers on the quantum channel 621 and discussing the outcome on the classical channel 625. The key that is established is then used to encrypt random numbers passed from the Alice sub-system, to the intermediate sub-system. The intermediate sub-system transmits these random numbers on the quantum channel 622 to Bob sub-system, 614. Alice sub-system, and Bob sub-system, now discuss the outcome on the classical channel to establish a key value which is known to Alice sub-system, 631 and Bob sub-system, 632. This shared key value can now be used to secure communication between $Node_1$ and $Node_4$.

Alice sub-system$_2$ 612 uses the same method to establish a key with Bob sub-system$_2$. This key can then be used to secure communication between $Node_2$ and $Node_5$.

Each of the Alice and Bob subsystems may be a conventional Alice and Bob unit with the additional functionality in the Alice units of having a crypto-unit for sending the random numbers on the classical channel.

The intermediate sub-system 613 is shown in more detail in FIG. 7. Quantum channel 621 is connected to a quantum receiver 701 and quantum channel 623 is connected to a quantum receiver 702. These two quantum receivers pass the signal they receive to Bob Control Logic 703. This uses the classical channel 625 to discuss the outcome with the appropriate Alice logic that sent the quantum signal.

Bob authenticates the discussion with Alice using an identity key. Bob stores the identity key for Alice sub-system, in Identity Store, and the identity key for Alice sub-system$_2$ in Identity Store$_2$.

The outcome of the discussion is a value known to both Alice and Bob. Part of this value is used to replace the identity key and the remainder is used as a key which is loaded into crypto 704.

Once the crypto 704 has been loaded with the generated key, the Bob Control Logic can receive encrypted random numbers from Alice. These are passed to quantum transmitter 707 and transmitted on quantum channel 622 if the signal is destined for Node$_4$ or to quantum transmitter 708 and transmitted on quantum channel 624 if it is destined for Node$_5$. The Bob Control Logic selects the quantum transmitter to be used by controlling switch 709.

The invention claimed is:

1. A method of quantum key distribution between a first node and a second node over an optical network via a network path, the network path between the first node and the second node comprising at least one intermediate node, the method comprising:
   agreeing a quantum key between the first node and each subsequent node in the network path in sequence until a quantum key is agreed between the first node and the second node, wherein
   agreeing a quantum key between the first node and each subsequent node in the network path includes:
      exchanging a quantum signal between a targeted node in the network path and the previous node in the network path, and
      agreeing a quantum key between the first node and the targeted node based on the quantum signal, wherein, when the first node is not itself involved in said quantum exchange, the first node communicates with the node previous to the targeted node in the network path such that the first node has the information necessary for agreeing a quantum key,
   the communication between the first node and the node previous to the targeted node being encrypted using the quantum key established with the previous node.

2. The method of quantum key distribution of claim 1, wherein each node in the optical network comprises at least one apparatus capable of transmitting and/or receiving a quantum signal suitable for quantum key distribution.

3. The method of quantum key distribution of claim 1, wherein agreeing a quantum key between the first node and the targeted node further comprises authenticating the targeted node.

4. The method of quantum key distribution of claim 1, further comprising encrypting communications between the first node and the second node with the quantum key agreed between the first node and the second node.

5. The method of quantum key distribution of claim 1, wherein each node in the optical network comprises a crypto-unit.

6. The method of quantum key distribution of claim 1, wherein the network path between the first and second node comprises a plurality of intermediate nodes.

7. The method of quantum key distribution of claim 1, wherein agreeing a quantum key between the first node and the target node further comprises using shared secret values established between the first node and the targeted node to update at least one identity key shared by the first node and the targeted node.

8. The method of quantum key distribution of claim 1, further comprising an intermediate node storing a separate identity key for each node in the optical network that the intermediate node agrees a quantum key with.

9. The method of quantum key distribution of claim 7, wherein each intermediate node does not store the identity keys stored by each adjacent intermediate node.

10. The method of quantum key distribution of claim 1, wherein the optical network is adapted for conventional optical communications.

11. The method of quantum key distribution of claim 1, wherein the optical network comprises at least one of the following:
   an active switch; or
   a passive optical switch.

12. The method of quantum key distribution of claim 1, further comprising:
   the first node agreeing a quantum key with a plurality of different destination nodes within the optical network; and
   the first node sending a traffic key to each of the destination nodes, wherein the first node uses the quantum key agreed with each of the destination nodes to establish the traffic key.

13. The method of quantum key distribution of claim 12, further comprising one or more nodes in the network acting as a key manager.

14. The method of quantum key distribution of claim 13, further comprising the one or more key manager providing, automatically or on request, the same traffic key to different nodes for communications across the network.

15. The method of quantum key distribution of claim 13, wherein the optical network comprises a plurality of communities, each community including a plurality of nodes wherein each community has an associated key manager that distributes a community key to the nodes within that community by quantum key distribution.

16. The method of quantum key distribution of claim 1, wherein each node transmits and receives at separate times a quantum signal via an optical link to adjacent nodes in the optical network.

17. The method of quantum key distribution of claim 1, wherein exchanging the quantum signal between the targeted node in the network path and the previous node in the network path comprises:
   the targeted node transmitting a quantum signal to the previous node; or
   the targeted node receiving a quantum signal from the previous node.

18. The method of quantum key distribution of claim 17, wherein the communication between the first node and the node previous to the targeted node comprises the node previous to the targeted node sending the first node details of the quantum signal received or transmitted by the targeted node.

19. The method of quantum key distribution of claim 18, further comprising the targeted node transmitting to the node previous to the targeted node details of the quantum signal that should be transmitted to the first node.

20. The method of quantum key distribution of claim 18, further comprising:

generating a string of random numbers;

communicating the string of random numbers between the first node and the node previous to the targeted node;

the first node using the string of random numbers as a seed in a pseudo-random number generator to produce a longer string of random numbers; and the node previous to the targeted node using the longer string to modulate the quantum signal.

\* \* \* \* \*